(12) United States Patent
Hong

(10) Patent No.: US 8,264,118 B2
(45) Date of Patent: Sep. 11, 2012

(54) MOTOR ASSEMBLY

(75) Inventor: Yin-Rong Hong, Kaohsiung (TW)

(73) Assignee: NS Micro Motor Technology Corp., New Taipei (TW)

( * ) Notice: Subject to any disclaimer, the term of this patent is extended or adjusted under 35 U.S.C. 154(b) by 232 days.

(21) Appl. No.: 12/881,717

(22) Filed: Sep. 14, 2010

(65) Prior Publication Data

US 2011/0309701 A1    Dec. 22, 2011

Related U.S. Application Data

(63) Continuation-in-part of application No. 12/818,419, filed on Jun. 18, 2010, now Pat. No. 8,143,761.

(30) Foreign Application Priority Data

Jul. 6, 2010   (TW) .............................. 99122169 A

(51) Int. Cl.
*H02K 1/18*     (2006.01)
*H02K 5/16*     (2006.01)
*H02K 5/02*     (2006.01)

(52) U.S. Cl. .................. 310/216.113; 310/425; 310/91; 310/90; 310/67 R

(58) Field of Classification Search ........... 310/216.113, 310/43, 425, 90, 91, 67 R
See application file for complete search history.

(56) References Cited

U.S. PATENT DOCUMENTS

| | | | | |
|---|---|---|---|---|
| 5,610,462 A * | 3/1997 | Takahashi | ....................... | 310/90 |
| 6,072,261 A * | 6/2000 | Lin | ............................... | 310/424 |
| 6,847,141 B2 * | 1/2005 | Wang | ............................... | 310/91 |
| 6,882,074 B2 | 4/2005 | Horng et al. | | |

* cited by examiner

*Primary Examiner* — Quyen Leung
*Assistant Examiner* — Leda Pham
(74) *Attorney, Agent, or Firm* — Frommer Lawrenc & Haug LLP; Ronald R Santucci

(57) ABSTRACT

A motor assembly includes a flexible base mount having an axial tube, a rigid outer mounting shell member inserted into and retained to the axial tube by retaining and retained members disposed therebetween, a stator winding subassembly surrounding the outer mounting shell member and supported by resting on a surrounding ledge of the axial tube, a plug member engaging in a socket cavity of the outer mounting shell member, a flexible inner mounting shell member inserted into the outer mounting shell member, a rotating shaft of a rotor subassembly received in the inner mounting shell member and rotatably born by an antifriction bearing, and an upper positioning ring resting on the bearing. Leakage of lubricant and deformation of the inner mounting shell member can be prevented.

11 Claims, 31 Drawing Sheets

MOTOR ASSEMBLY

CROSS-REFERENCE TO RELATED APPLICATION

This application claims priority of Taiwanese Patent Application No. 099122169, filed on Jul. 6, 2010, the disclosure of which is herein incorporated by reference.

This application is a continuation-in-part of U.S. patent application Ser. No. 12/818,419, filed by the applicant on Jun. 18, 2010, the entire disclosure of which is incorporated herein by reference.

BACKGROUND OF THE INVENTION

1. Field of the Invention

This invention relates to a motor assembly, more particularly to a brushless electric motor assembly having an axial tube for reliably positioning an antifriction bearing.

2. Description of the Related Art

Referring to FIG. 1, a motor structure disclosed in U.S. Pat. No. 6,882,074 B2 includes a stator 14 and a circuit board 13 which are engaged together and which are mounted to a hollow tube of a casing 11, and an axial tube 12 mounted into the hollow tube of the casing 11 from a bottom end of the hollow tube and in splined engagement therewith such that hook portions 122 of a plurality of resilient arms 121 are brought into engagement with the stator 14. A positioning ring 10, a supporting member 17, and an abrasion-resisting plate 20 are mounted into the axial tube 12. A sleeve 15 having a bearing 16 mounted therein is inserted into and is tightly engaged with the axial tube 12. A shaft 18 of a rotor 19 extends through the bearing 16 and the positioning ring 10. Since the axial tube 12 and the sleeve 15 exert forces on each other, the sleeve 15 is tightly engaged with the bearing 16, and the resilient arms 121 are securely engaged with the stator 14.

However, due to the arrangement of the open-ended sleeve 15, lubricating oil between the bearing 16 and the shaft 18 may leak through the bottom of the sleeve 15 by virtue of gravity, thereby adversely affecting running of the shaft 19 and resulting in generation of noise. Moreover, since the axial tube 12 and the sleeve 15 are preferably made from a plastic material in order to facilitate fitting engagement, the structural strength thereof is relatively low, so that deformation may occur during assembly.

SUMMARY OF THE INVENTION

An object of the present invention is to provide a motor assembly which enables a shaft of a rotor to revolve smoothly and steadily, and which has a relatively high structural strength.

According to this invention, the motor assembly includes a base mount made from a flexible material, and including a base seat and an axial tube which extends along an axis from an inner periphery of the base seat to terminate at an upper peripheral end abutment and which has an inner tubular surface to define a central hole. An outer mounting shell member is made from a rigid material, defines a column space therein, and includes a lower tubular wall segment defining a socket cavity, a middle tubular wall segment fitted in the axial tube, and an upper tubular wall segment extending beyond the upper peripheral end abutment to permit the upper peripheral end abutment to serve as a surrounding ledge. A stator winding subassembly includes a plurality of laminated cores surrounding the upper tubular wall segment and supported by resting on the surrounding ledge. Retaining and retained members are respectively disposed on the lower tubular wall segment and the inner tubular surface. Immediately after the middle tubular wall segment is brought to be fitted in the axial tube from the inner periphery, the retained member is in axial frictional engagement with the retaining member. A plug member is configured to engage in the socket cavity. An inner mounting shell member is made from a flexible material, and is insertable into the column space of the outer mounting shell member. The inner mounting shell member includes a bushing segment fitted in both the upper and middle tubular wall segments, and a receptacle cap extending radially from the bushing segment. A rotor subassembly includes a rotating shaft extending along the axis and surrounded by the bushing segment. An antifriction bearing is disposed between the rotating shaft and the bushing segment to permit rotation of the rotating shaft about the axis relative to the receptacle cap. An upper positioning ring is configured to rest on an upper end of the antifriction bearing.

By virtue of the plug member which is disposed to close the socket cavity, and by provision of the upper positioning ring, leakage of lubricant can be prevented.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Figure 1:
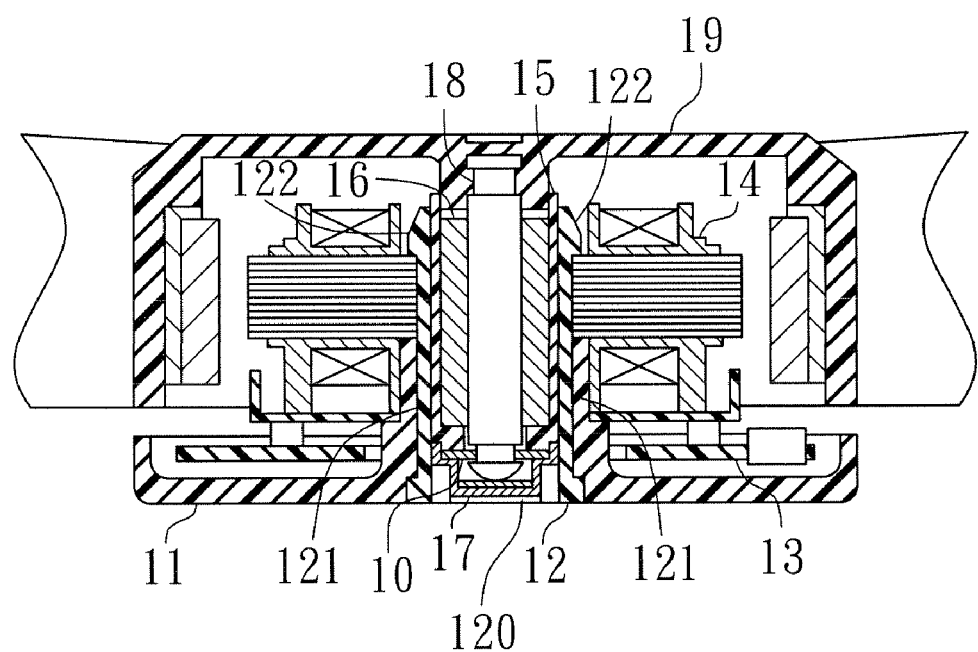
FIG. 1 is a sectional view of a conventional motor assembly disclosed in U.S. Pat. No. 6,882,074 B2.

Before the present invention is described in greater detail, it should be noted that same reference numerals have been used to denote like elements throughout the specification.

Figure 2:
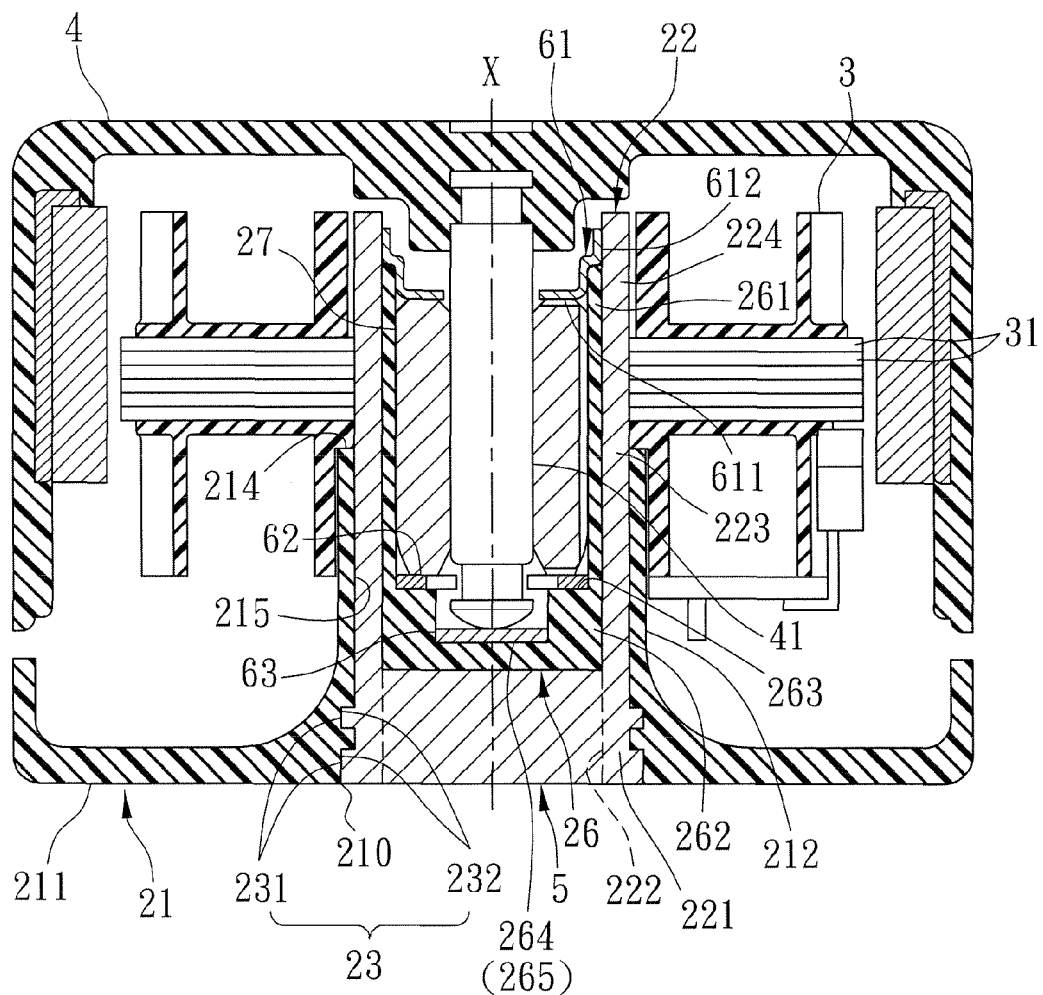
FIGS. 2 to 31 are respectively sectional views of the first to thirtieth preferred embodiments of a motor assembly according to this invention.

Referring to FIG. 2, the first preferred embodiment of a motor assembly according to the present invention is shown to comprise a base mount 21, an outer mounting shell member 22, a stator winding subassembly 3, a retaining unit 23, a plug member 5, an inner mounting shell member 26, a rotor subassembly 4, an antifriction bearing 27, and upper and lower positioning rings 61, 62.

The base mount 21 is made from a flexible material, such as plastic, and includes a base seat 211 which has an inner periphery 210 that surrounds an axis (X), and an axial tube 212 which extends along the axis (X) from the inner periphery 210 to terminate at an upper peripheral end abutment 214. The axial tube 212 has an inner tubular surface 215 to define a central hole.

The outer mounting shell member 22 is made from a rigid material, such as metal, defines a column space therein, and includes a lower tubular wall segment 221 which defines a socket cavity 222, and which is fitted in the inner periphery 210, a middle tubular wall segment 223 which extends upwardly from the lower tubular wall segment 221 and which is fitted in the axial tube 212, and an upper tubular wall segment 224 which extends from the middle tubular wall segment 223 beyond the upper peripheral end abutment 214 to permit the upper peripheral end abutment 214 to serve as a surrounding ledge 214. Preferably, the outer mounting shell member 22 is overmolded with the base mount 21 by virtue of injection molding.

The stator winding subassembly 3 includes a plurality of laminated cores 31 which are disposed to surround the upper tubular wall segment 224 and which are supported by resting on the surrounding ledge 214.

The retaining unit 23 includes two pairs of retaining and retained members 231,232 respectively disposed on the lower tubular wall segment 221 and the inner tubular surface 215 adjacent to the inner periphery 210. In this embodiment, the retaining and retained members 231, 232 are configured to cooperatively constitute a snap-fit mechanism, such as a block and a recess. Immediately after the middle tubular wall segment 223 is brought to be fitted in the axial tube 212 from the inner periphery 210, the retained member 232 is in axial frictional engagement with the retaining member 231 so as to guard against axial movement of the outer mounting shell member 221 relative to the base mount 21.

The plug member 5 is configured to engage in the socket cavity 222 so as to guard against radial disengagement between the retaining and retained members 231, 232. In this embodiment, the plug member 5 is integrally formed in the socket cavity 222.

The inner mounting shell member 26 is made from a flexible material, and is inserted into the column space of the outer mounting shell member 22 from the upper tubular wall segment 224. The inner mounting shell member 26 includes a bushing segment 261 fitted in both the upper and middle tubular wall segments 224, 223, and a receptacle cap 262 extending radially from the bushing segment 261 to rest on the plug member 5. The receptacle cap 262 has an annular shoulder surface 263 which surrounds the axis (X) and which faces upwardly, and a receptacle body 264 which extends downwardly from the annular shoulder surface 263 to terminate at a bottom bearing surface 265.

The rotor subassembly 4 includes a rotating shaft 41 which extends along the axis (X), and which is surrounded by the bushing segment 261.

The antifriction bearing 27 is disposed between the rotating shaft 41 and the bushing segment 261 to permit the rotating shaft 41 to rotate about the axis (X) relative to the receptacle cap 262.

Preferably, an abrasion-resisting pad 63 is disposed between the bottom bearing surface 265 and the rotating shaft 41 so as to increase wearability of the bottom bearing surface 265.

The upper positioning ring 61 has a ring base 611 sleeved on the rotating shaft 41 and resting on an upper end of the antifriction bearing 27, and a skirt portion 612 disposed to flare from the ring base 611, and configured to urge against the bushing segment 261 and an inner surface of the upper tubular wall segment 224.

The lower positioning ring 62 is disposed between a lower end of the antifriction bearing 27 and the annular shoulder surface 263 and is configured to fittingly permit the rotating shaft 41 to pass therethrough while guarding against movement of the rotating shaft 41 away from the bottom bearing surface 265 of the receptacle cap 262.

As illustrated, by virtue of the plug member 5 which is disposed to close the socket cavity 222, and the upper and lower positioning rings 61, 62, leakage of lubricant can be prevented. Additionally, since the outer mounting shell member 22 is made from rigid material and the inner mounting shell member 26 is made from flexible material, deformation of the inner mounting shell member 26 can be avoided when insertion of the same into the outer mounting shell member 22 so as to enhance the structural stability thereof. Moreover, since the outer mounting shell member 22 may be overmolded with the base mount by injection molding, and since the plug member 5 is disposed to guard against the radial disengagement between the retaining and retained members 231, 232, the manufacture cost is low without compromising the firmness and preciseness of the assembled motor structure because of high capability of modularization of its components.

Figure 3:
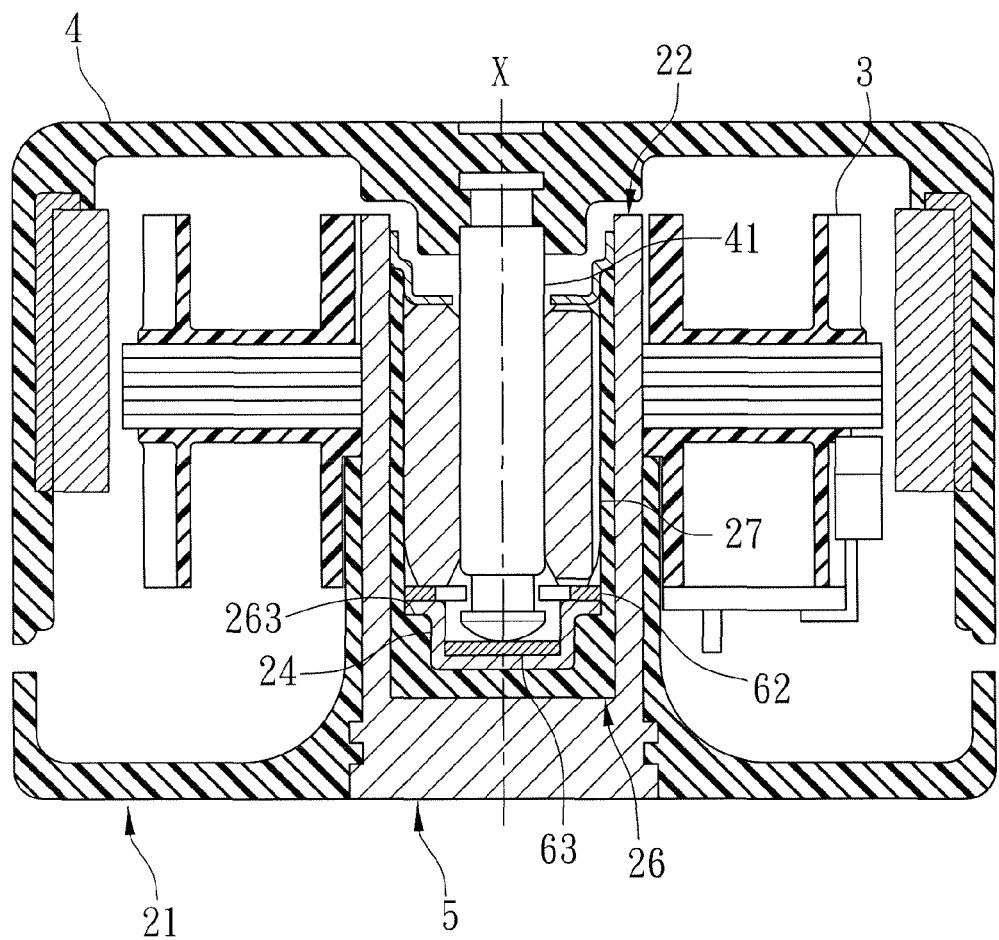

Referring to FIG. 3, the second preferred embodiment further comprises a support member 24 made from a rigid material, and configured to be superimposed on the annular shoulder surface 263 and the bottom bearing surface 265 to provide a support for the lower positioning ring 62 and the abrasion-resisting pad 63.

Figure 4:
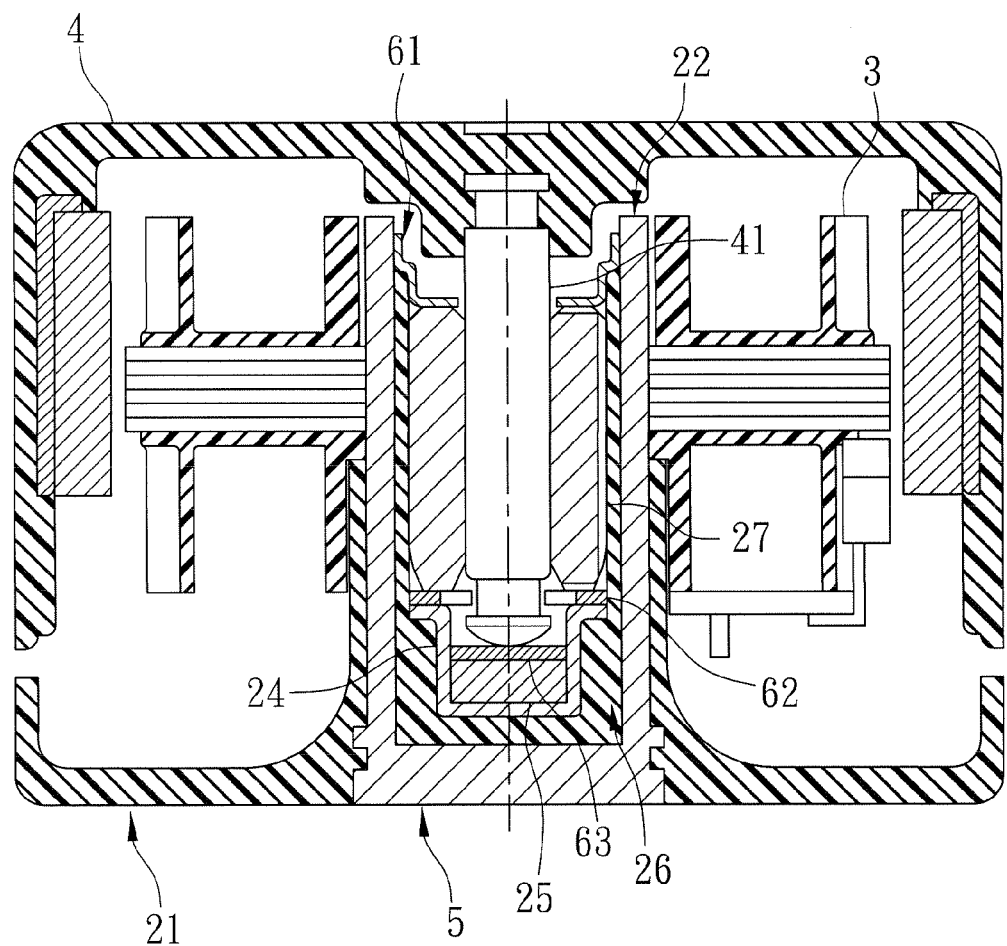

Referring to FIG. 4, the third preferred embodiment further comprises a magnet 25 disposed between the support member 24 and the abrasion-resisting pad 63 to stabilize rotation of the rotating shaft 41.

Figure 5:
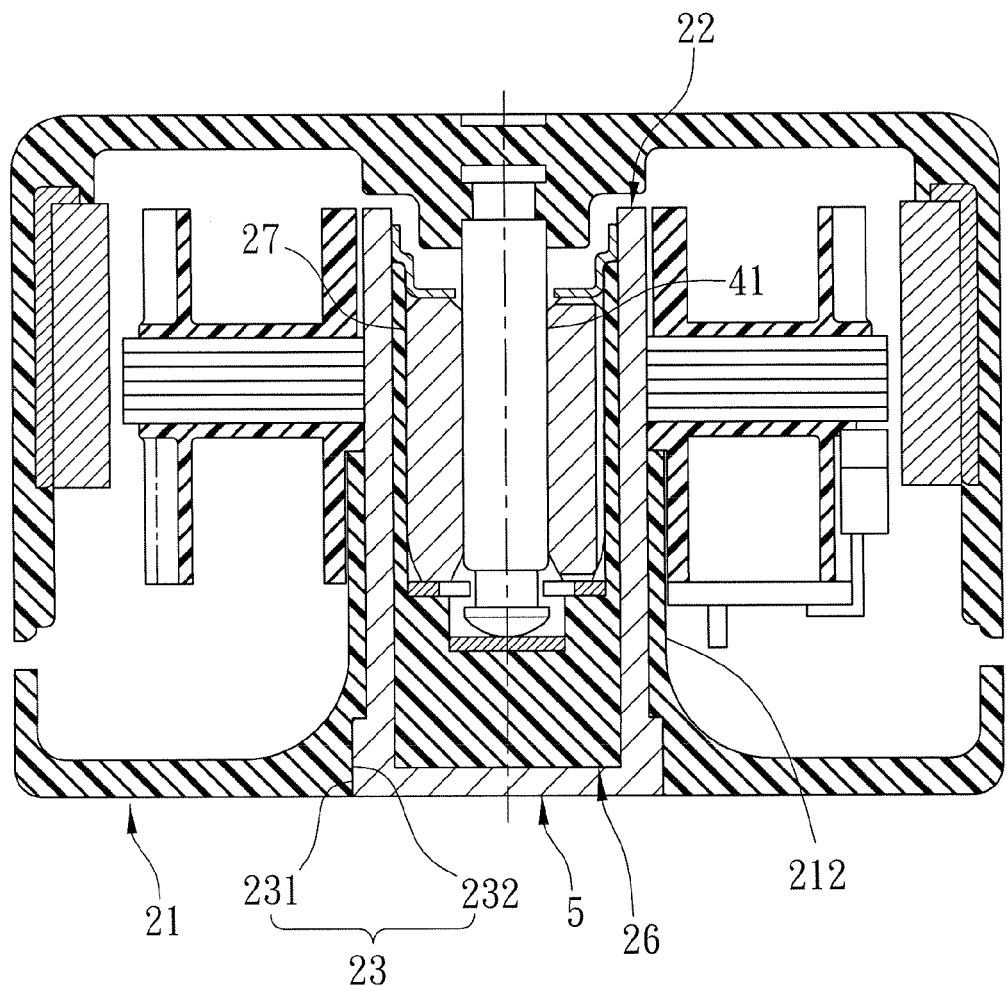
Figure 6:
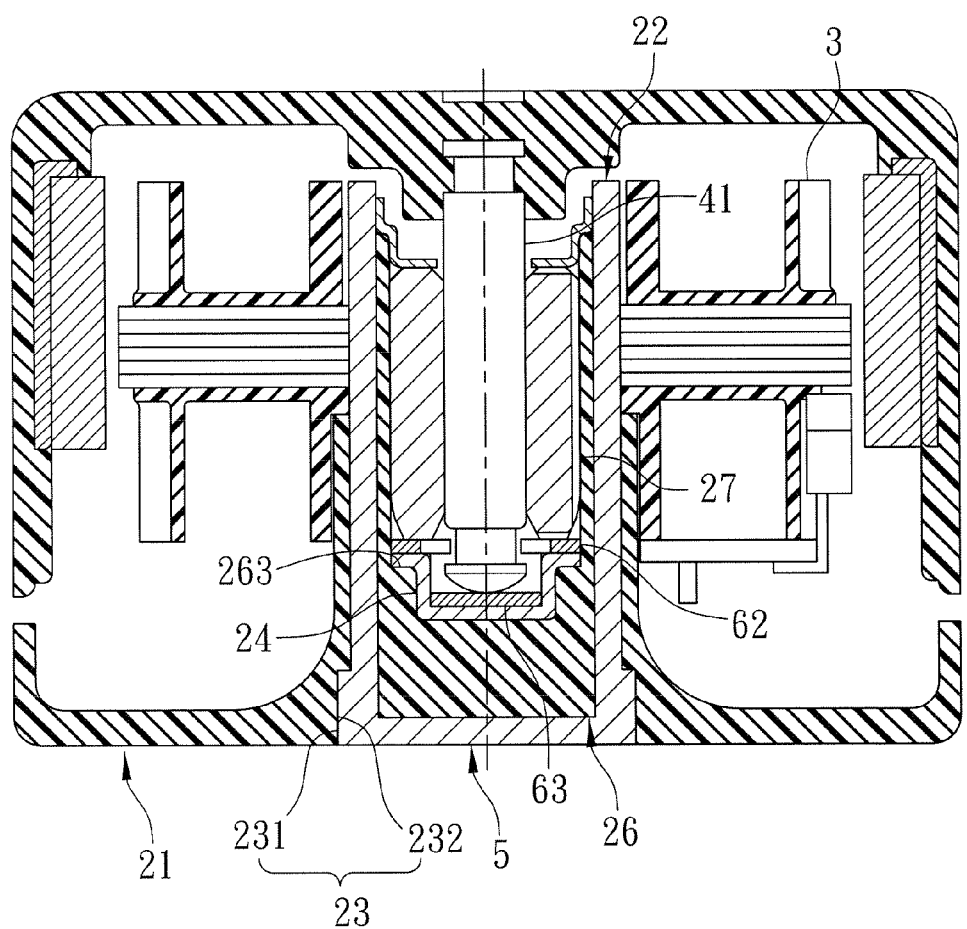
Figure 7:
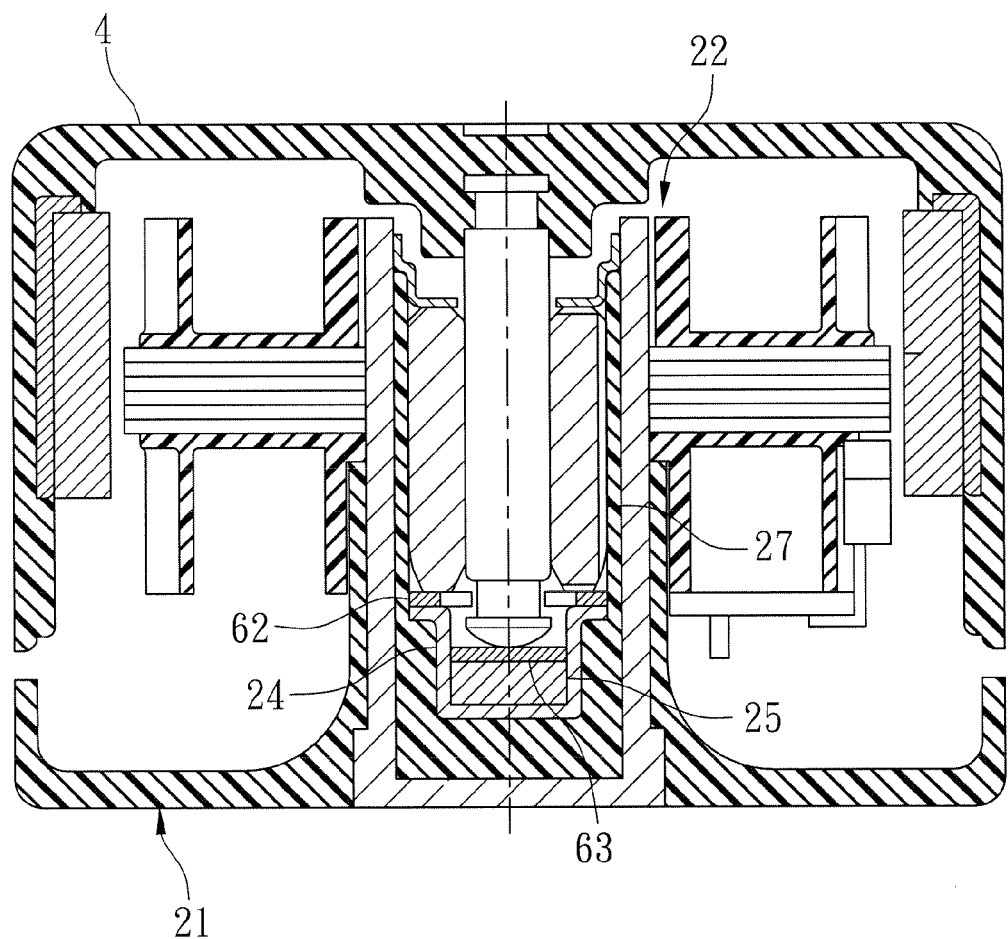

FIGS. 5 to 7 show the fourth, fifth and sixth preferred embodiments which are similar to the first, second and third preferred embodiments, respectively, except that the retaining unit 23 includes one retaining member 231 and one retained member 232 to simplify the manufacturing process of the outer mounting shell member 22.

Figure 8:
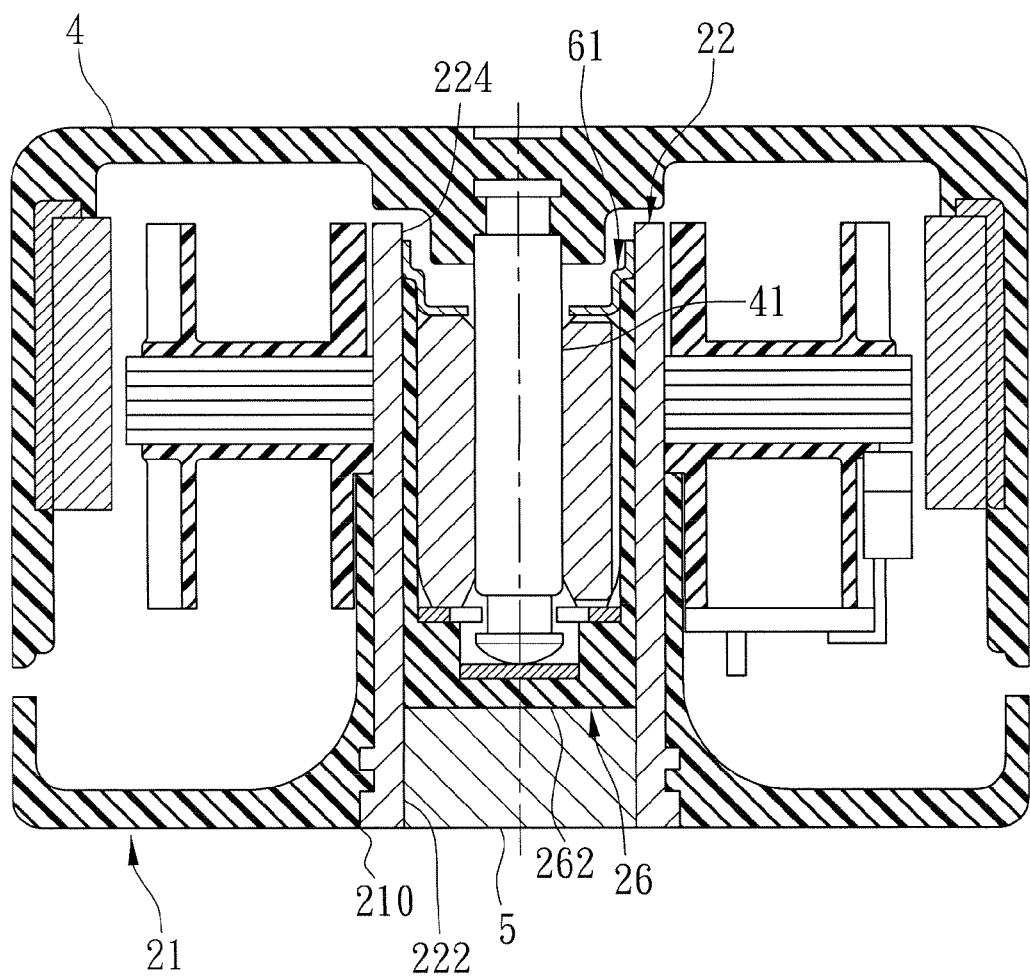
Figure 9:
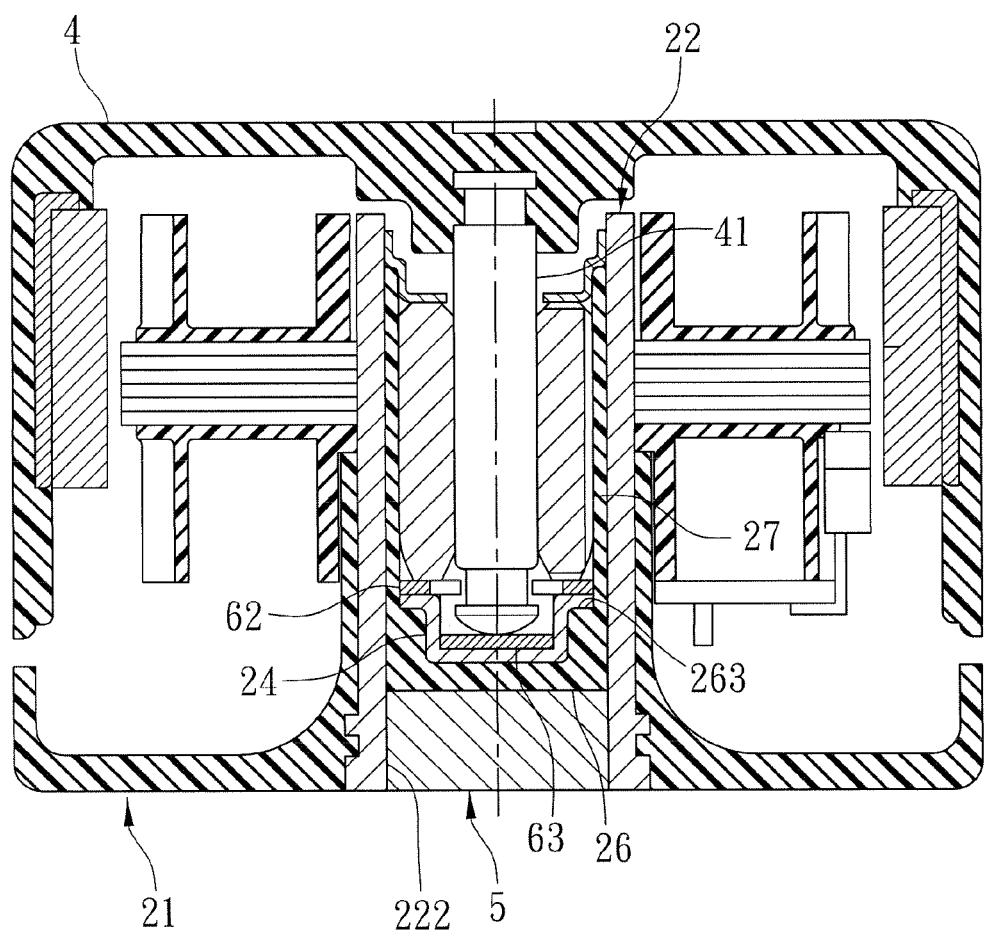
Figure 10:
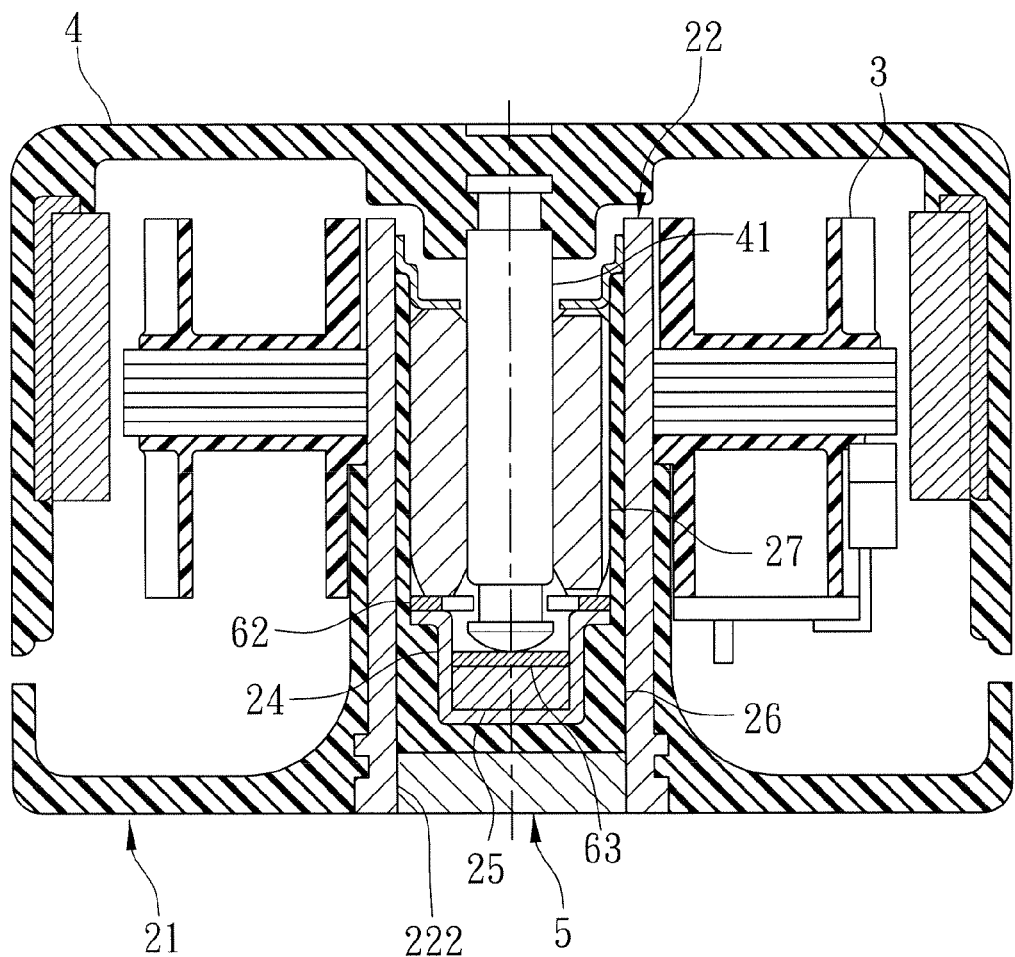

FIGS. 8 to 10 show the seventh, eighth and ninth preferred embodiments which are similar to the first, second and third preferred embodiments, respectively, except that the plug member 5 is a separate piece from the outer mounting shell member 22, and is configured to be fitted in the socket cavity 222 for abutment of the receptacle cap 262 thereagainst. Thus, the height position of the inner mounting shell member 26 relative to the outer mounting shell member 22 can be predetermined, thereby simplifying the designing process for modularization of the upper positioning ring 61.

Figure 11:
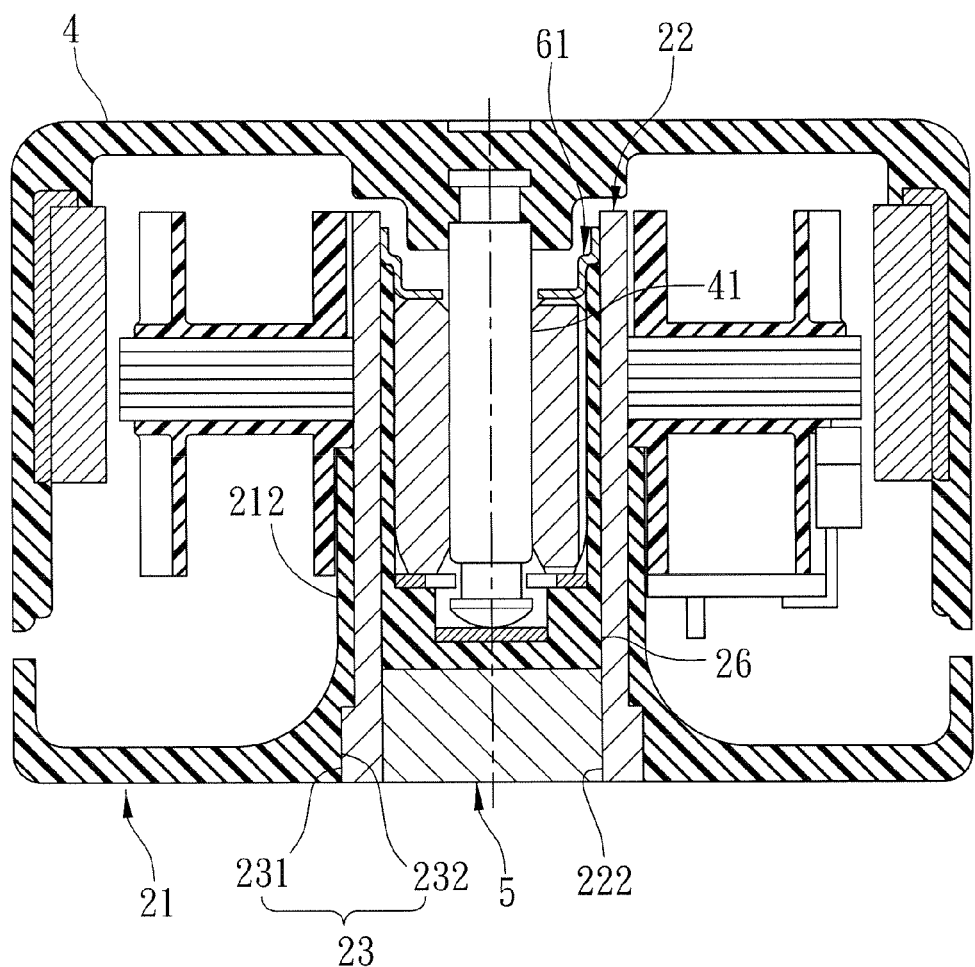
Figure 12:
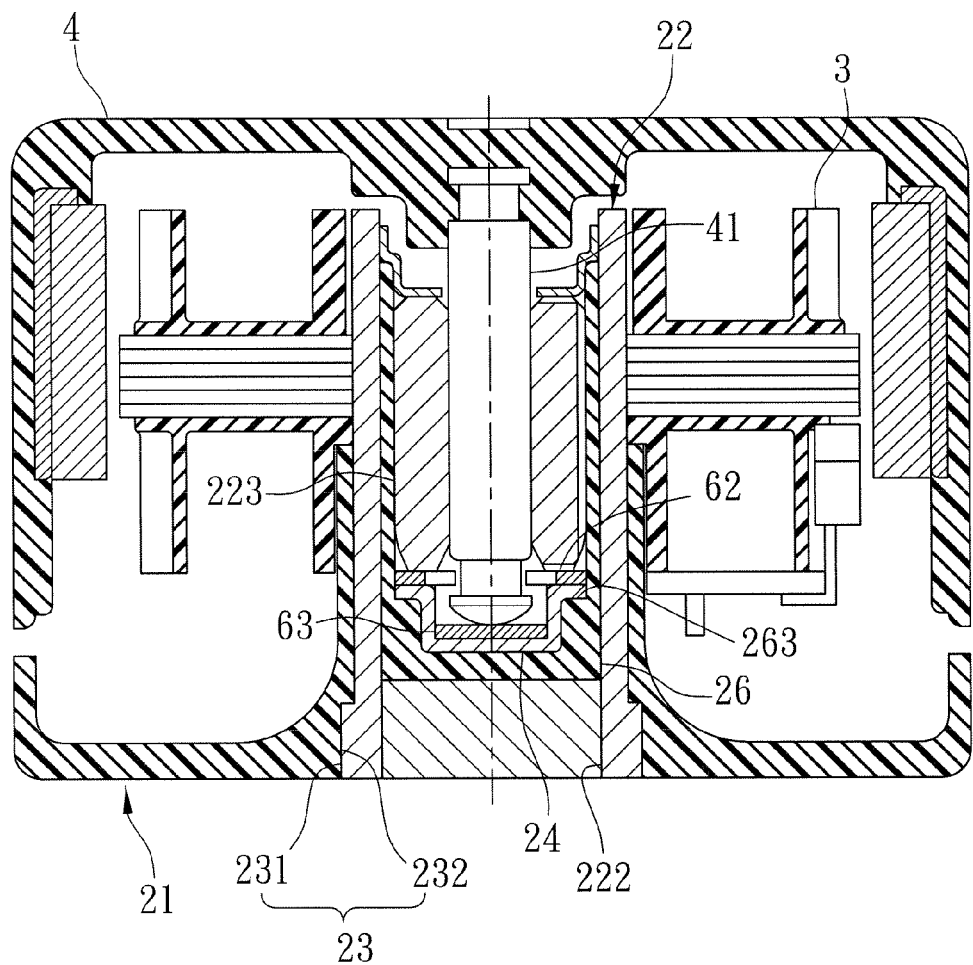
Figure 13:
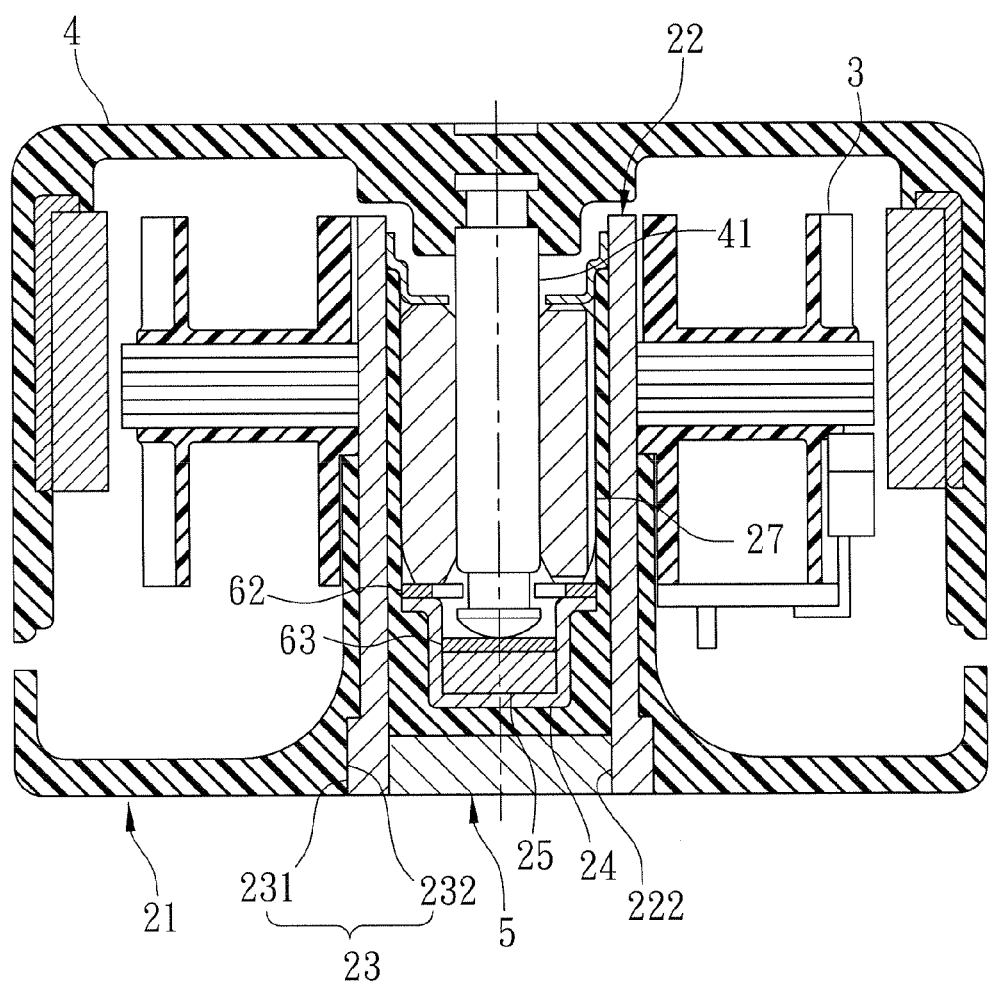

FIGS. 11 to 13 show the tenth, eleventh and twelfth preferred embodiments which are similar to the seventh, eighth and ninth preferred embodiments, respectively, except that the retaining unit 23 includes one retaining member 231 and one retained member 232 to simplify the manufacturing process of the outer mounting shell member 22.

Figure 14:
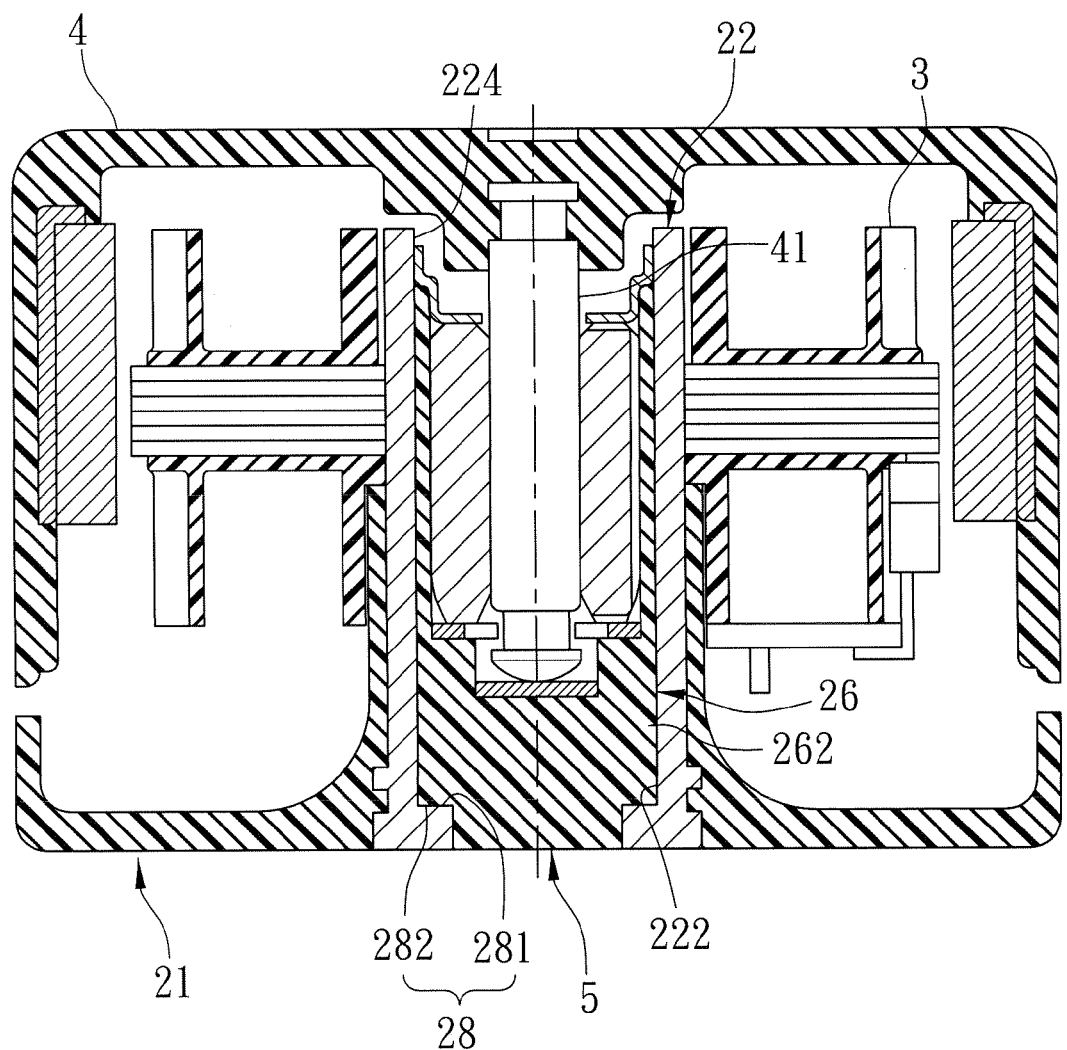
Figure 15:
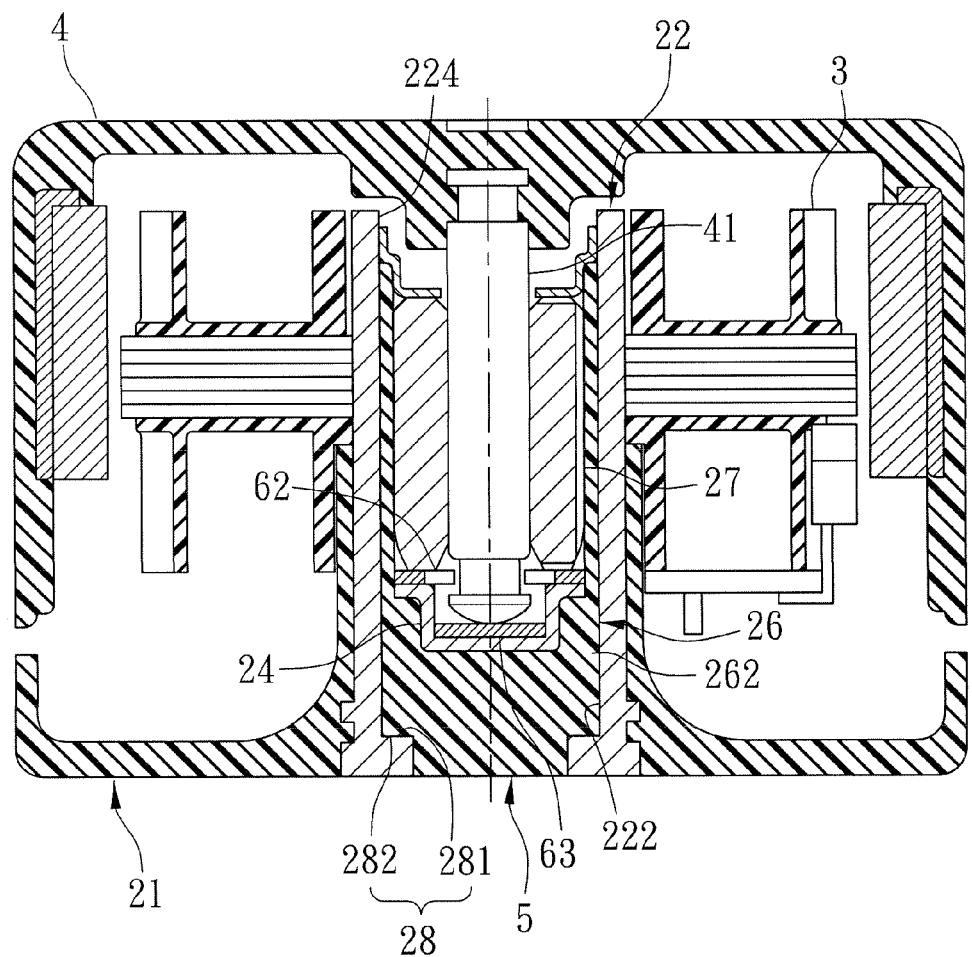
Figure 16:
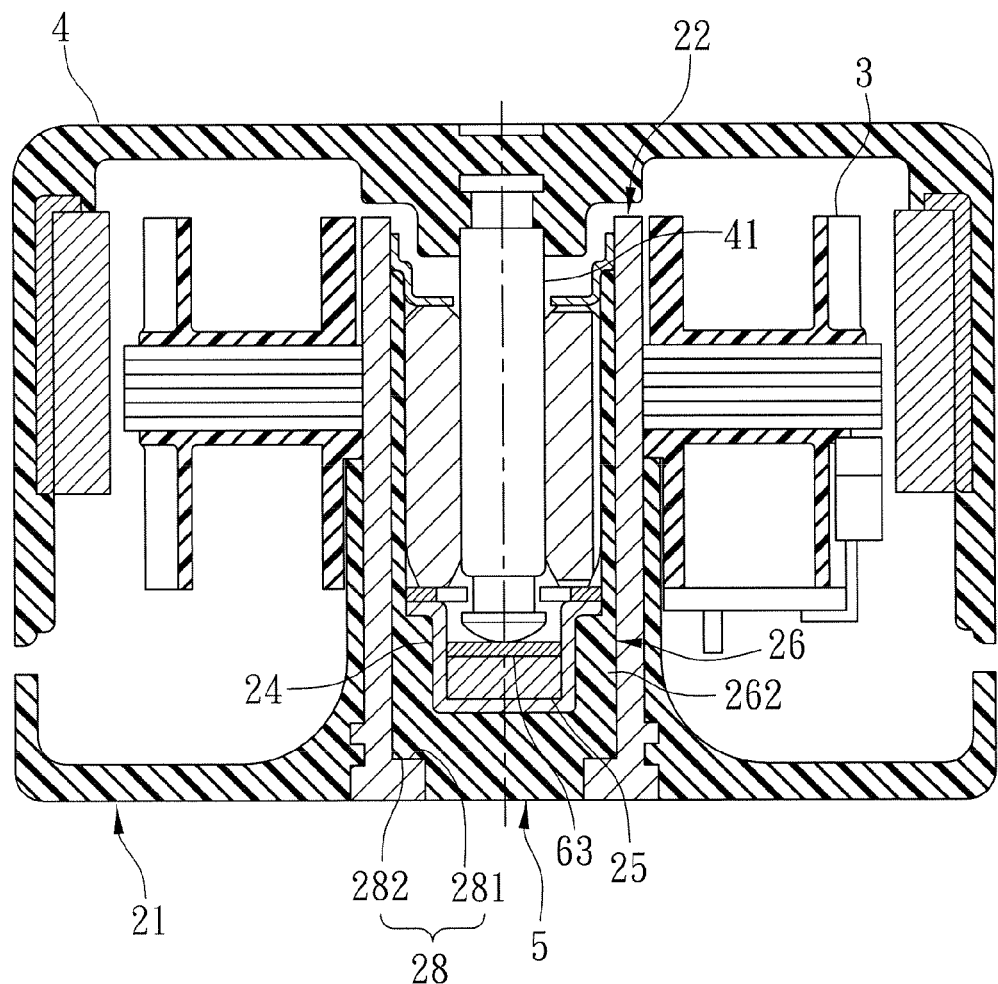

FIGS. 14 to 16 show the thirteenth, fourteenth and fifteenth preferred embodiments which are similar to the first, second and third preferred embodiments, respectively, except that the plug member 5 is integrally formed with, and extends downwardly from the receptacle cap 262 of the inner mounting shell member 26 so as to be fitted in the socket cavity 222. In addition, a coupling unit 28 includes upward and downward abutments 281, 282 respectively disposed on the outer mounting shell member 22 and the plug member 5. Immediately after the inner mounting shell member 26 as well as the plug member 5 is inserted into the column space of the outer mounting shell member 22 from the upper tubular wall segment 224, the downward abutment 282 abuts against the upward abutment 281 to guard against axial movement of the inner mounting shell member 26 relative to the outer mounting shell member 22.

Figure 17:
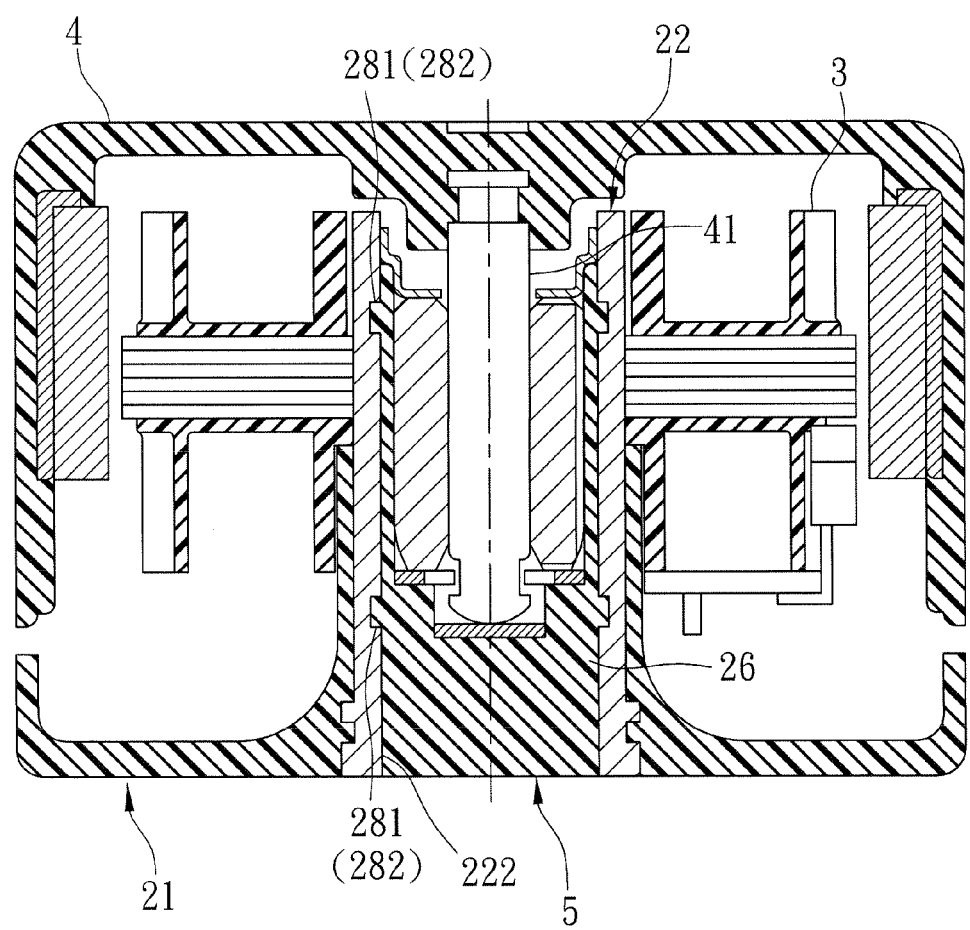
Figure 18:
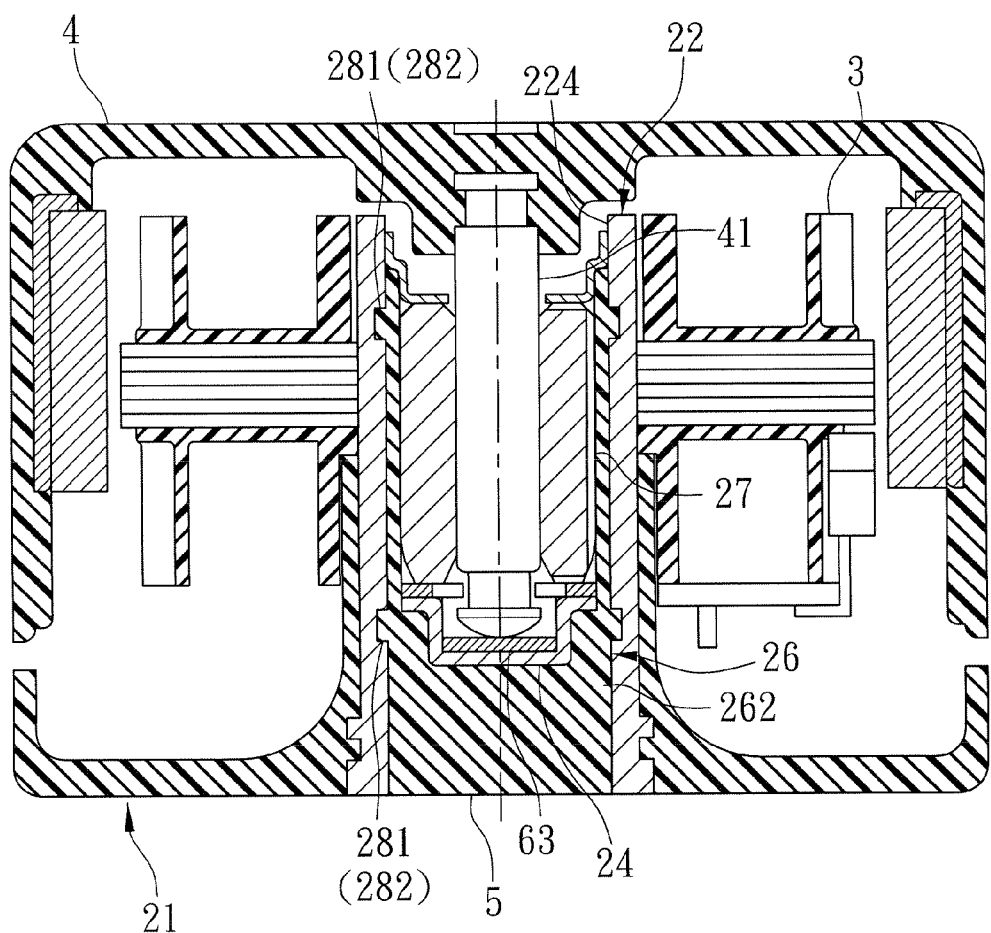
Figure 19:
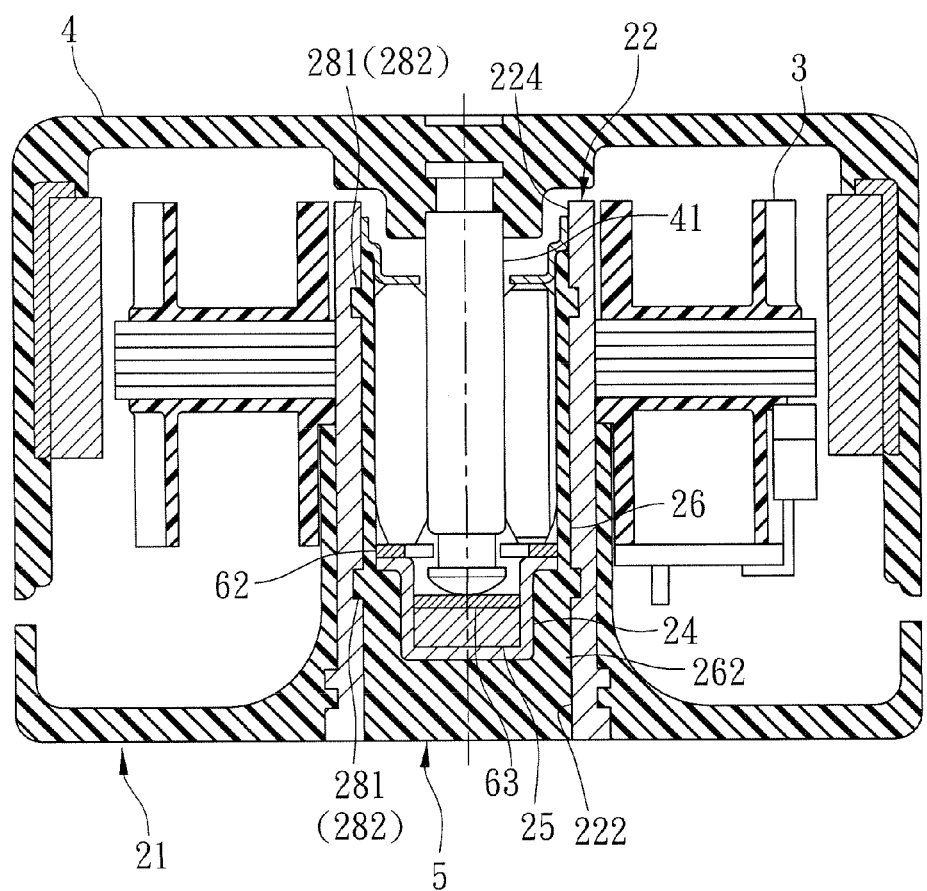

FIGS. 17 to 19 show the sixteenth, seventeenth and eighteenth preferred embodiments which are similar to the thirteenth, fourteenth and fifteenth preferred embodiments, respectively, except that the coupling unit 28 includes two pairs of the upward and downward abutments 281, 282 respectively disposed on the outer mounting shell member 22 and the inner mounting shell member 26.

Figure 20:
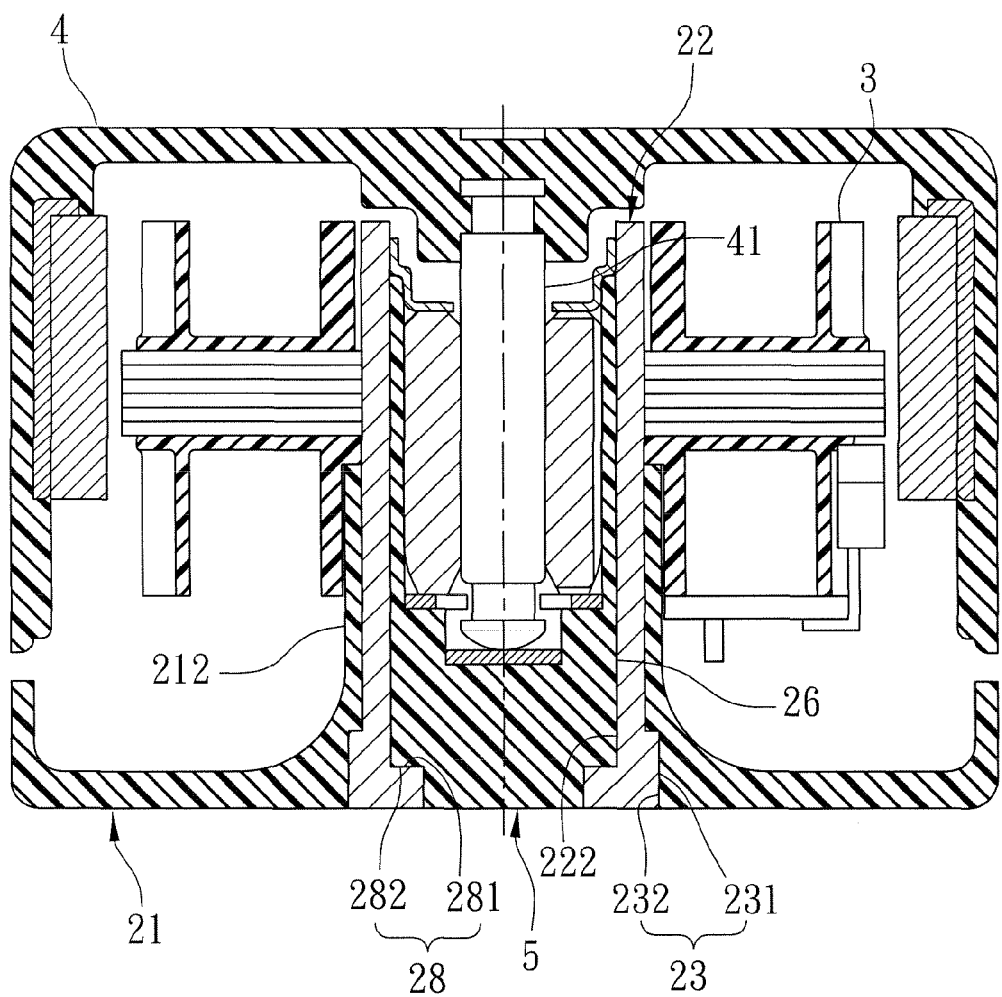
Figure 21:
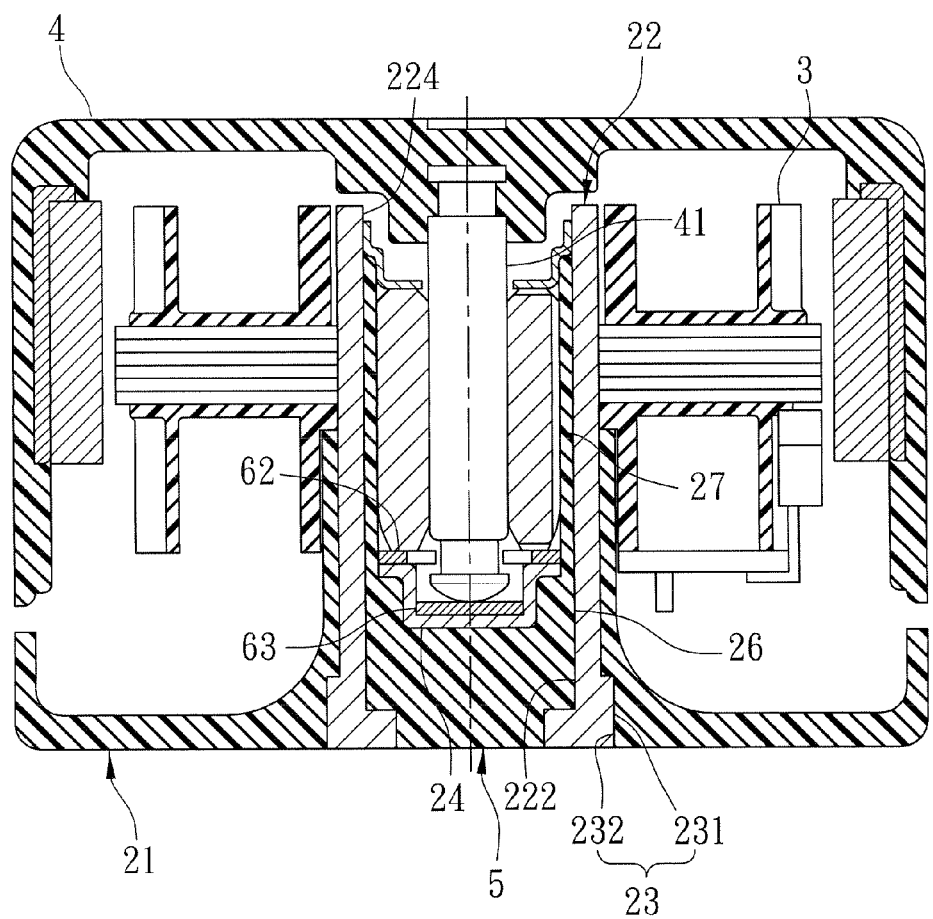
Figure 22:
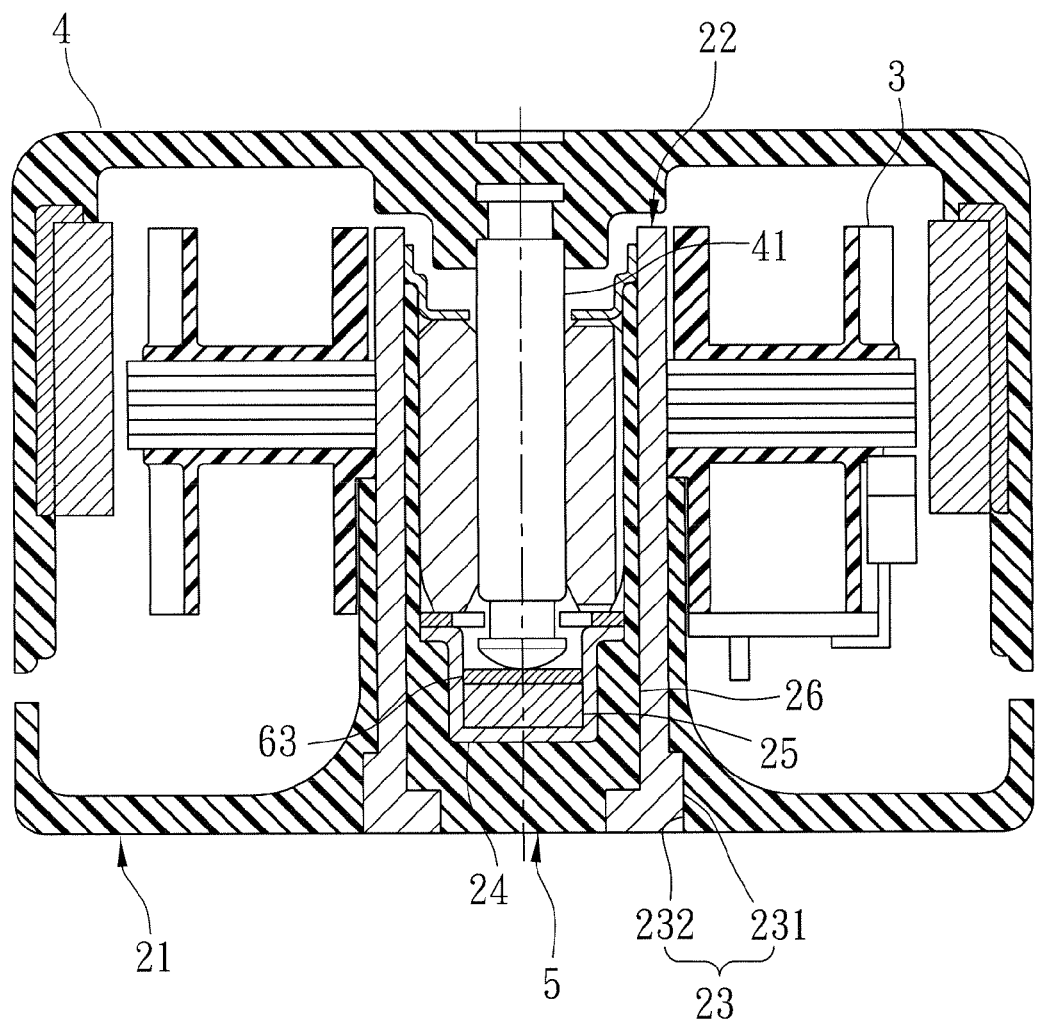

FIGS. 20 to 22 show the nineteenth, twentieth and twenty-first preferred embodiments which are similar to the thirteenth, fourteenth and fifteenth preferred embodiments, respectively, except that the retaining unit 23 includes one retaining member 231 and one retained member 232 to simplify the manufacturing process of the outer mounting shell member 22.

Figure 23:
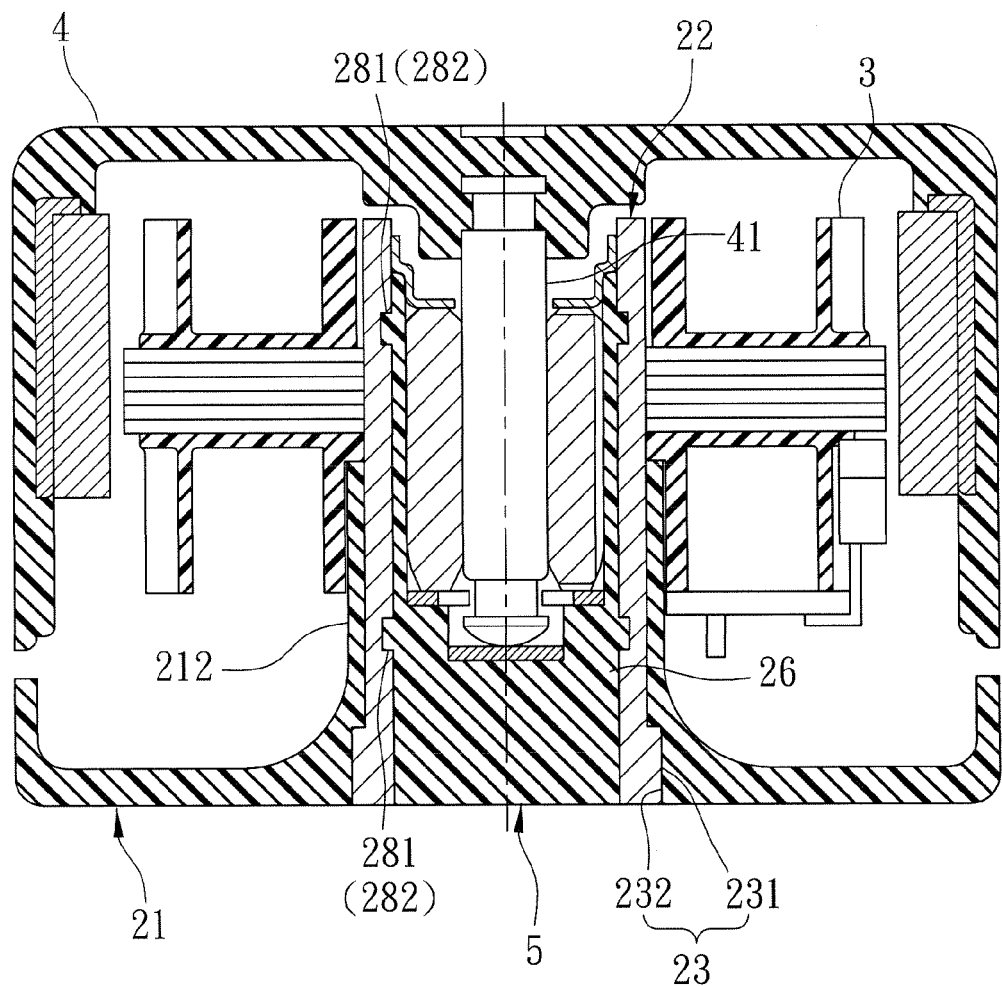
Figure 24:
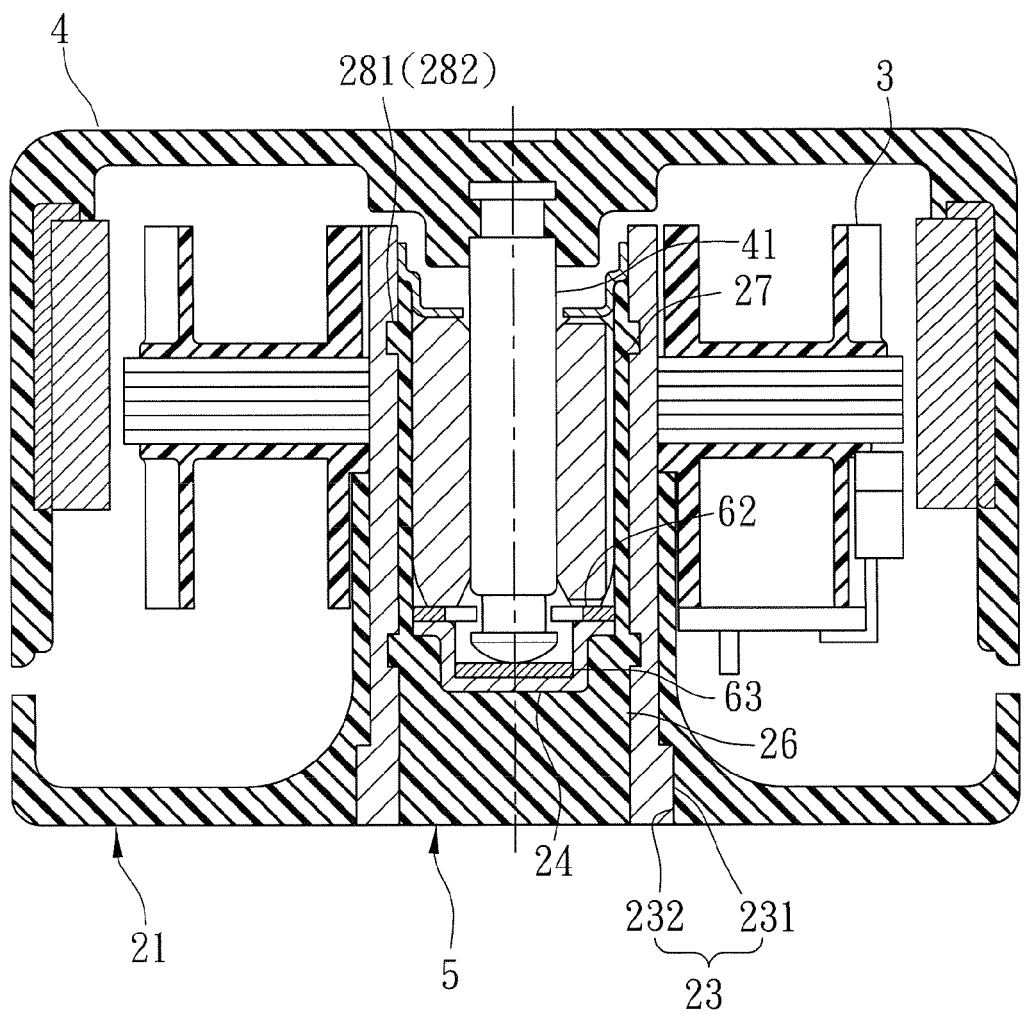
Figure 25:
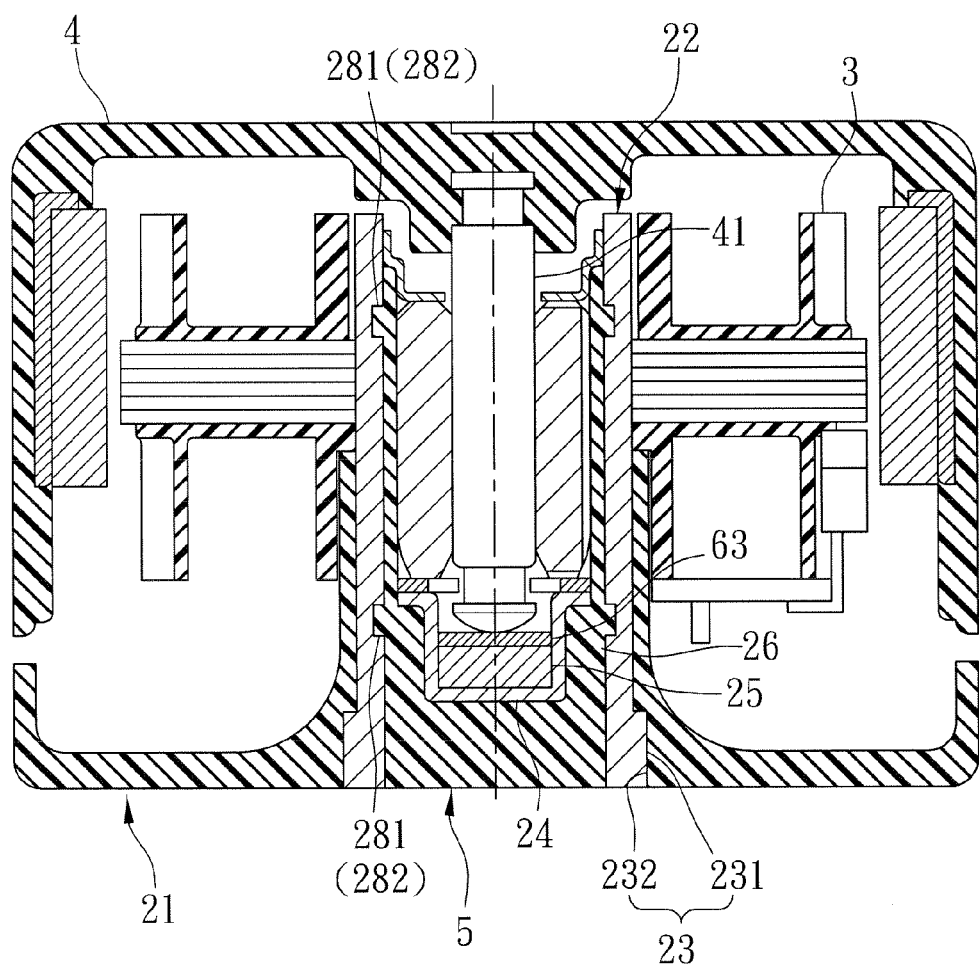
Figure 26:
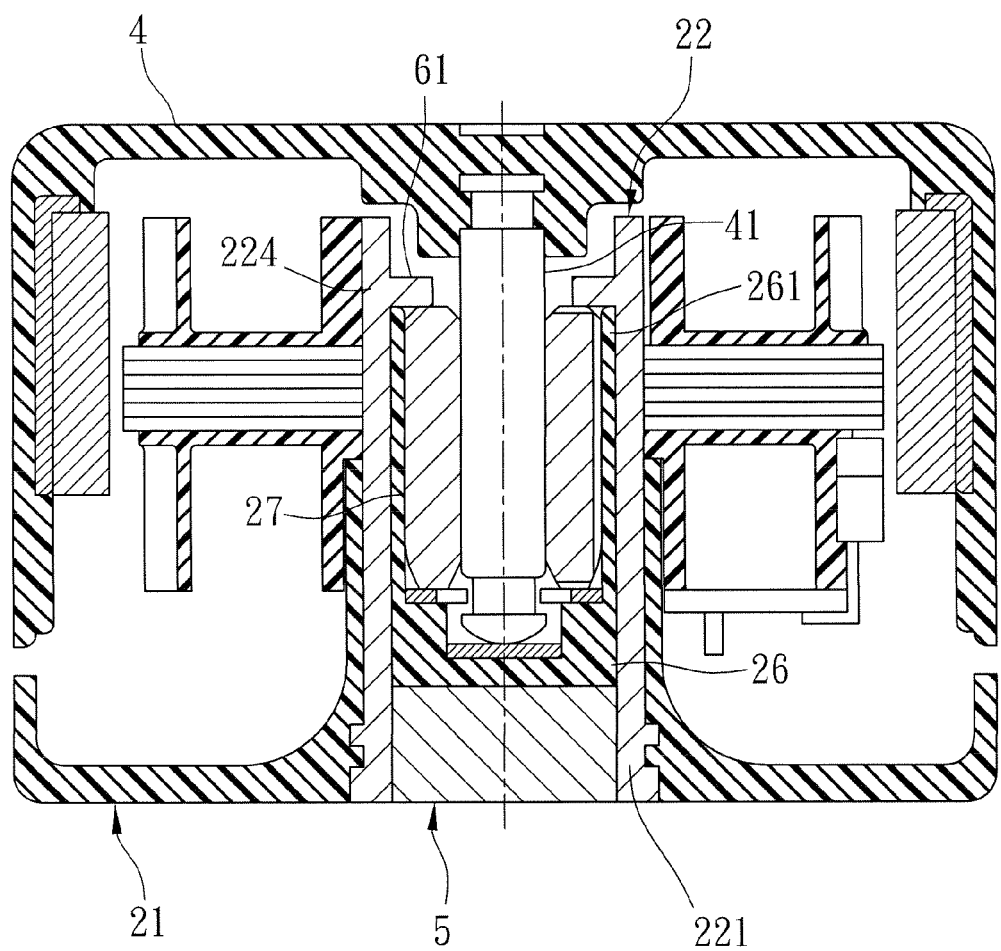
Figure 27:
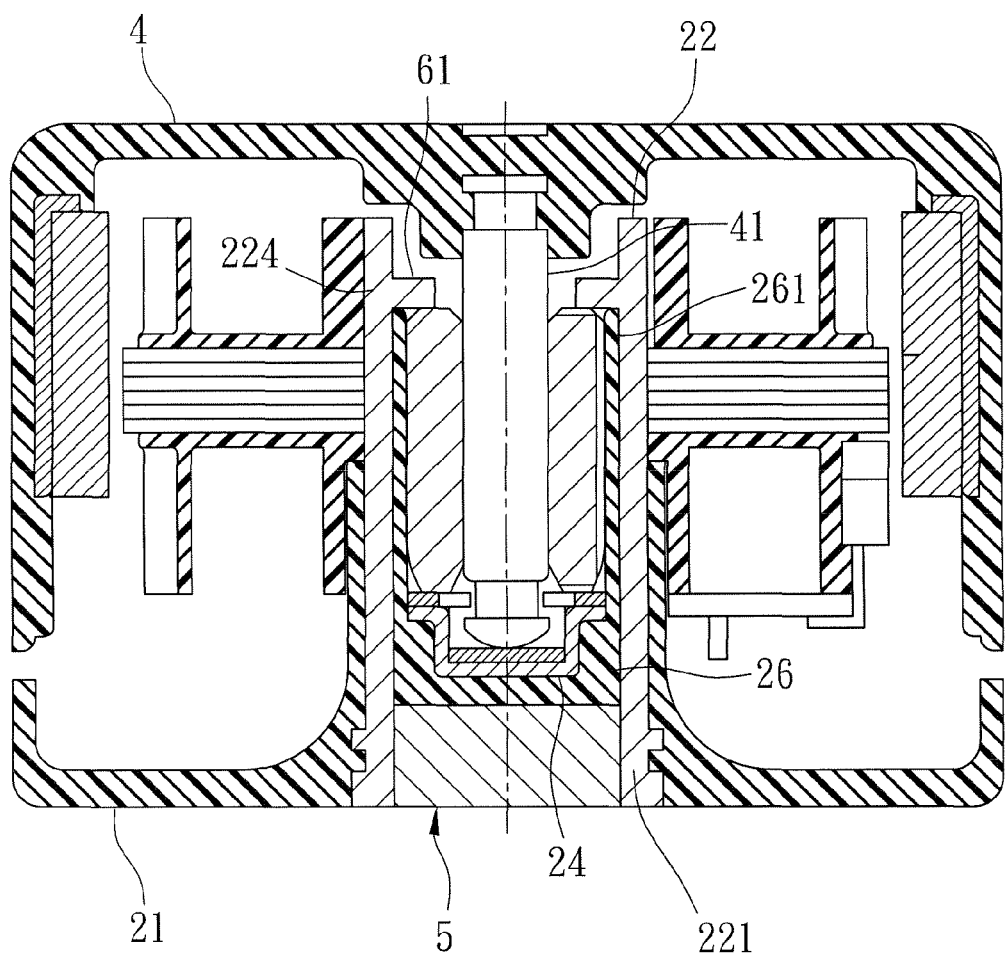
Figure 28:
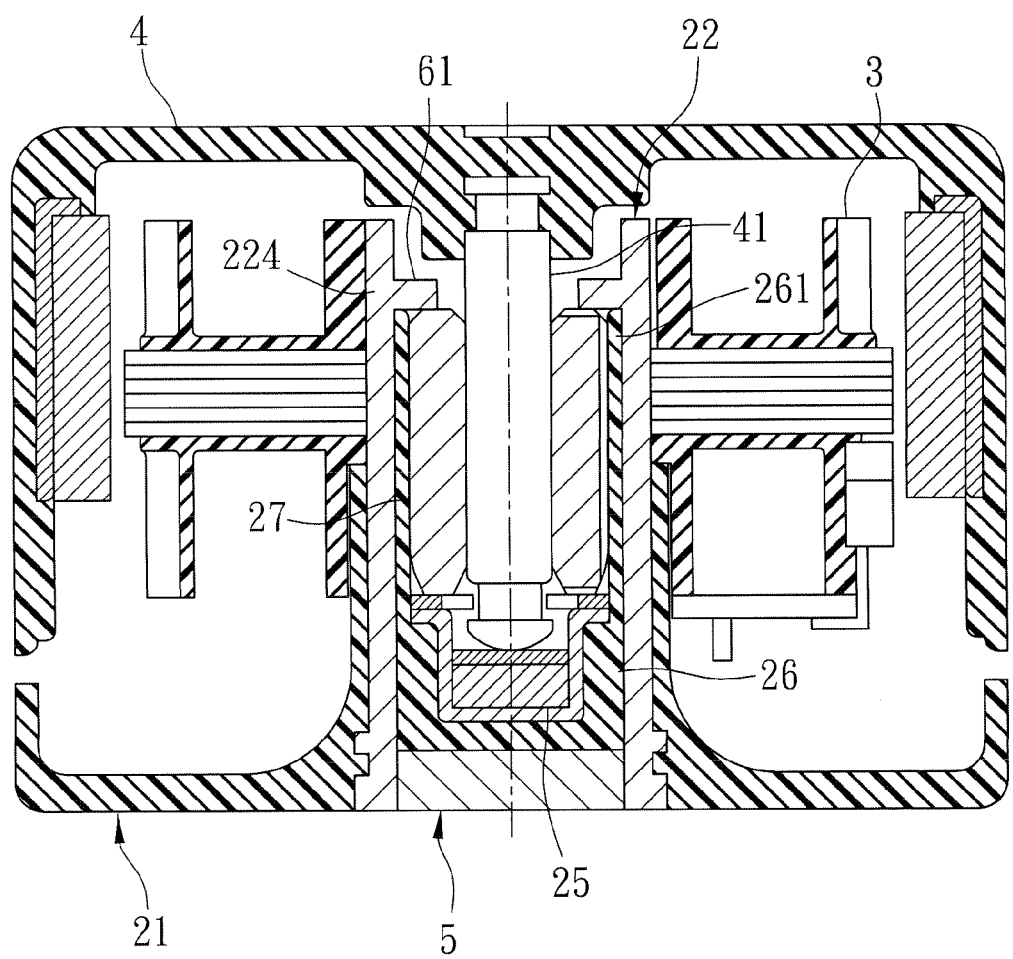
Figure 29:
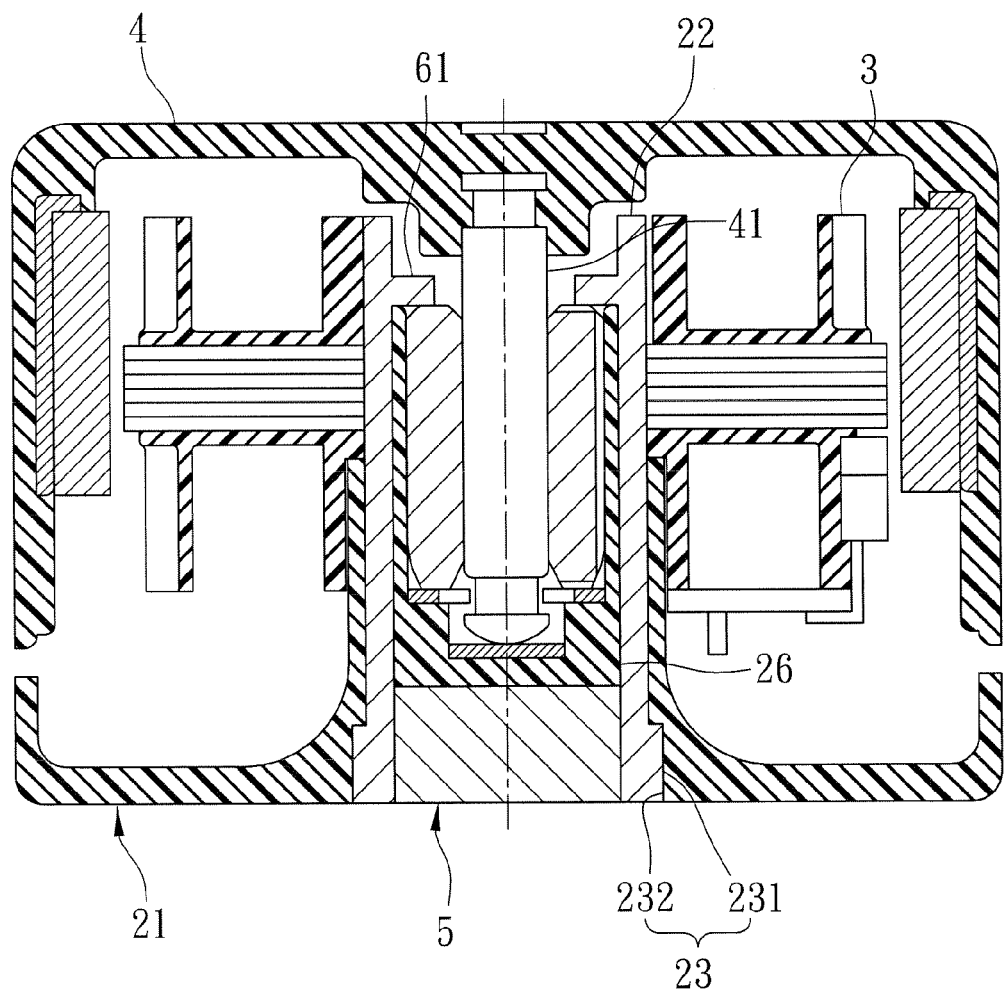
Figure 30:
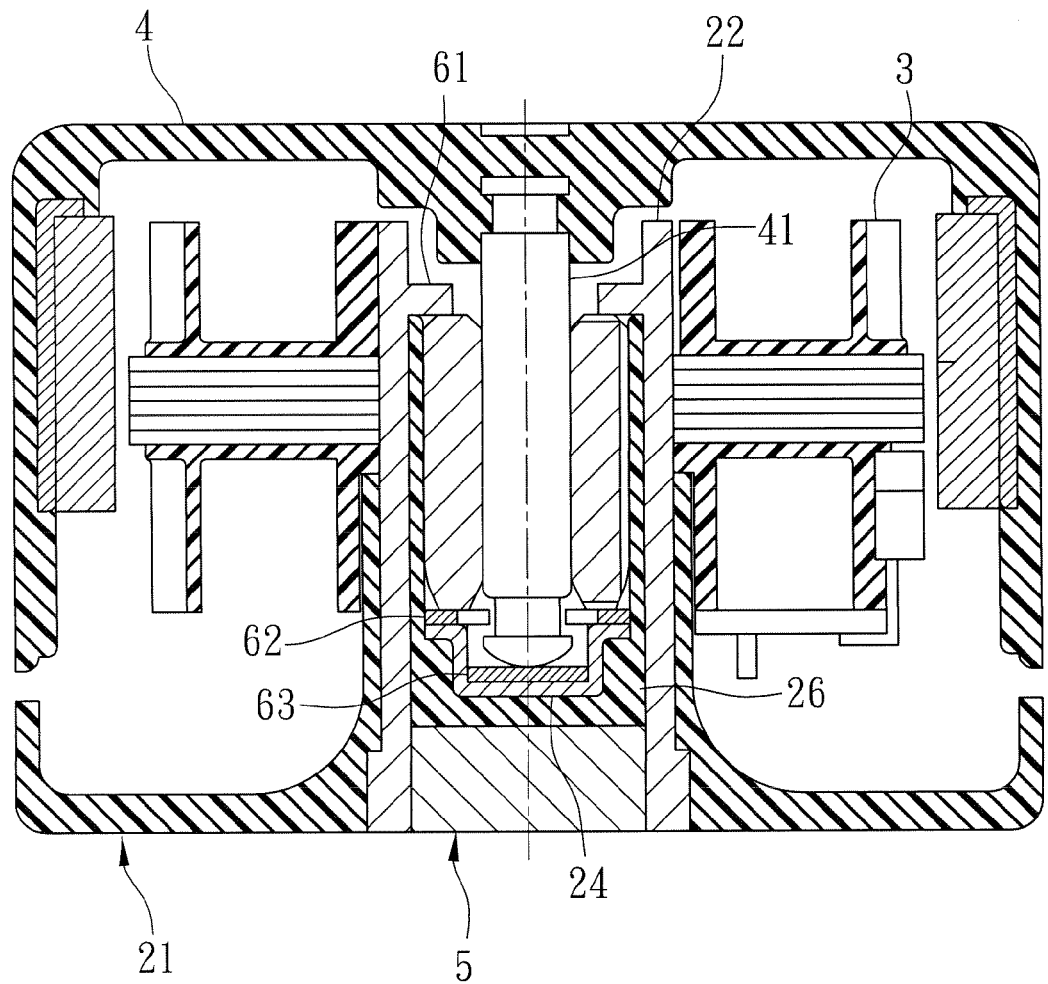
Figure 31:
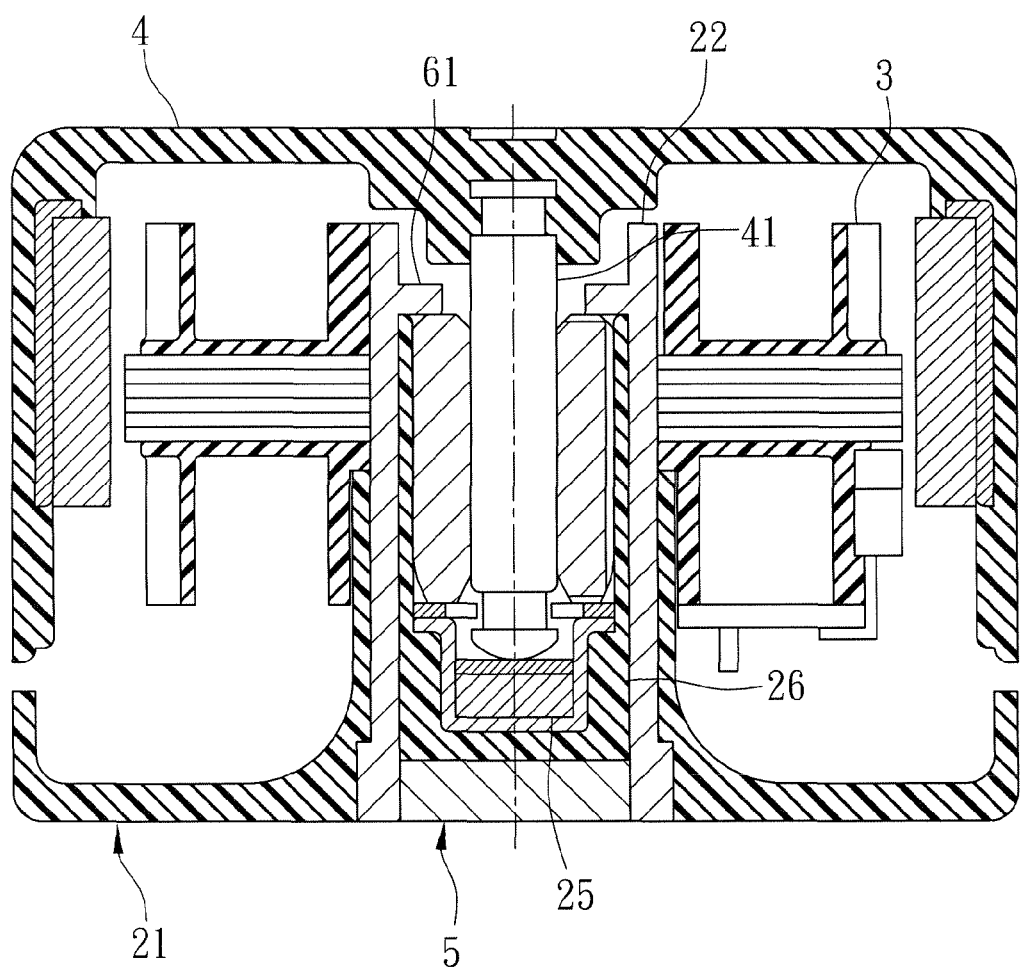

FIGS. 23 to 25 show the twenty-second, twenty-third and twenty-fourth preferred embodiments which are similar to the sixteenth, seventeenth and eighteenth preferred embodiments, respectively, except that the retaining unit 23 includes one retaining member 231 and one retained member 232 to simplify the manufacturing process of the outer mounting shell member 22.

FIGS. 26 to 31 show the twenty-fifth to thirtieth preferred embodiments which are similar to the seventh to twelfth preferred embodiments, respectively, except that the upper positioning ring 61 is integrally formed with, and extends radially and inwardly from the upper tubular wall segment 224 of the outer mounting shell member 22 to abut against the bushing segment 261 and the upper end of the antifriction bearing 27. In these embodiments, the inner mounting shell member 26 is inserted into the column space of the outer mounting shell member 22 from the lower tubular wall segment 221.

While the present invention has been described in connection with what are considered the most practical and preferred embodiments, it is understood that this invention is not limited to the disclosed embodiments but is intended to cover various arrangements included within the spirit and scope of the broadest interpretations and equivalent arrangements.

What is claimed is:

1. A motor assembly comprising:
   a base mount made from a flexible material, and including a base seat which has an inner periphery that surrounds an axis, and an axial tube which extends along the axis from said inner periphery to terminate at an upper peripheral end abutment, said axial tube having an inner tubular surface to define a central hole;
   an outer mounting shell member made from a rigid material, defining a column space therein, and including a lower tubular wall segment which defines a socket cavity, and which is fitted in said inner periphery, a middle tubular wall segment which extends upwardly from said lower tubular wall segment and which is fitted in said axial tube, and an upper tubular wall segment which extends from said middle tubular wall segment beyond said upper peripheral end abutment to permit said upper peripheral end abutment to serve as a surrounding ledge;
   a stator winding subassembly including a plurality of laminated cores which are disposed to surround said upper tubular wall segment and which are supported by resting on said surrounding ledge;
   retaining and retained members respectively disposed on said lower tubular wall segment and said inner tubular surface adjacent to said inner periphery, and configured such that, immediately after said middle tubular wall segment is brought to be fitted in said axial tube from said inner periphery, said retained member is in axial frictional engagement with said retaining member so as to guard against axial movement of said outer mounting shell member relative to said base mount;
   a plug member configured to engage in said socket cavity so as to guard against radial disengagement between said retaining and retained members;
   an inner mounting shell member made from a flexible material, and insertable into said column space of said outer mounting shell member from one of said upper and lower tubular wall segments, said inner mounting shell member including a bushing segment which is fitted in both said upper and middle tubular wall segments, and a receptacle cap which extends radially from said bushing segment;
   a rotor subassembly including a rotating shaft which extends along the axis, and which is surrounded by said bushing segment;
   an antifriction bearing which is disposed between said rotating shaft and said bushing segment to permit rotation of said rotating shaft about the axis relative to said receptacle cap; and
   an upper positioning ring which is configured to rest on an upper end of said antifriction bearing.

2. The motor assembly according to claim 1, wherein said receptacle cap has an annular shoulder surface which surrounds the axis and which faces upwardly, and a receptacle body which extends downwardly from said annular shoulder surface to terminate at a bottom bearing surface;
   said motor assembly further comprising a lower positioning ring which is disposed between a lower end of said antifriction bearing and said annular shoulder surface and which is configured to fittingly permit said rotating shaft to pass therethrough while guarding against movement of said rotating shaft away from said bottom bearing surface; and
   an abrasion-resisting pad disposed between said bottom bearing surface and said rotating shaft so as to increase wearability of said bottom bearing surface.

3. The motor assembly according to claim 2, further comprising a support member made from a rigid material, and configured to be superimposed on said annular shoulder surface and said bottom bearing surface to provide a support for said lower positioning ring and said abrasion-resisting pad.

4. The motor assembly according to claim 3, further comprising a magnet disposed between said support member and said abrasion-resisting pad to stabilize rotation of said rotating shaft.

5. The motor assembly according to claim 1, wherein said upper positioning ring has a ring base sleeved on said rotating shaft and resting on said upper end of said antifriction bearing, and a skirt portion disposed to flare from said ring base and configured to abut against said bushing segment and said upper tubular wall segment.

6. The motor assembly according to claim 1, wherein said upper positioning ring is integrally formed with, and extends radially and inwardly from said upper tubular wall segment of said outer mounting shell member to abut against said bushing segment and said antifriction bearing, and wherein said inner mounting shell member is inserted into said column space from said lower tubular wall segment.

7. The motor assembly according to claim 1, wherein said plug member is integrally formed in said socket cavity, said inner mounting shell member being inserted into said column space from said upper tubular wall segment to permit said receptacle cap to rest on said plug member.

8. The motor assembly according to claim 1, wherein said plug member is configured to be fitted in said socket cavity for abutment of said receptacle cap thereagainst.

9. The motor assembly according to claim 1, wherein said plug member is integrally formed with, and extends downwardly from said receptacle cap to be fitted in said socket cavity, said inner mounting shell member being inserted into said column space from said upper tubular wall segment.

10. The motor assembly according to claim 9, further comprising upward and downward abutments respectively disposed on said outer mounting shell member and one of said plug member and said inner mounting shell member, and configured such that, immediately after said inner mounting shell member is inserted into said column space, said downward abutment abuts against said upward abutment to guard against axial movement of said inner mounting shell member relative to said outer mounting shell member.

11. The motor assembly according to claim 1, wherein said outer mounting shell member is overmolded with said base mount by virtue of injection molding.

* * * * *